United States Patent
Kobayashi et al.

(10) Patent No.: US 9,894,056 B2
(45) Date of Patent: Feb. 13, 2018

(54) SEGMENTED SECRET-KEY STORAGE SYSTEM, SEGMENT STORAGE APPARATUS, SEGMENTED SECRET-KEY STORAGE METHOD

(71) Applicant: NIPPON TELEGRAPH AND TELEPHONE CORPORATION, Chiyoda-ku (JP)

(72) Inventors: Tetsutaro Kobayashi, Tokyo (JP); Go Yamamoto, Tokyo (JP); Reo Yoshida, Tokyo (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 294 days.

(21) Appl. No.: 14/760,935

(22) PCT Filed: Jan. 16, 2014

(86) PCT No.: PCT/JP2014/050652
§ 371 (c)(1),
(2) Date: Jul. 14, 2015

(87) PCT Pub. No.: WO2014/112551
PCT Pub. Date: Jul. 24, 2014

(65) Prior Publication Data
US 2016/0028719 A1    Jan. 28, 2016

(30) Foreign Application Priority Data
Jan. 17, 2013  (JP) ................. 2013-006648

(51) Int. Cl.
*H04L 29/06* (2006.01)
*H04L 9/08* (2006.01)
*H04L 9/32* (2006.01)

(52) U.S. Cl.
CPC .......... *H04L 63/0823* (2013.01); *H04L 9/085* (2013.01); *H04L 9/0894* (2013.01);
(Continued)

(58) Field of Classification Search
CPC ............. H04L 63/0823; H04L 63/0435; H04L 9/3252; H04L 63/0876; H04L 63/061; H04L 9/085
See application file for complete search history.

(56) References Cited

U.S. PATENT DOCUMENTS

| | | | | |
|---|---|---|---|---|
| RE36,918 E | * | 10/2000 | Micali | .................... G06Q 20/00 380/30 |
| 8,270,615 B2 | * | 9/2012 | Hanaoka | ............. H04L 63/0428 380/277 |
| 9,083,514 B2 | * | 7/2015 | Zhu | ..................... H04L 63/0815 |
| 2012/0163590 A1 | | 6/2012 | Lieber et al. | |

FOREIGN PATENT DOCUMENTS

| | | |
|---|---|---|
| JP | 2001 166687 | 6/2001 |
| JP | 2001 189719 | 7/2001 |

(Continued)

OTHER PUBLICATIONS

Office Action dated Jul. 12, 2016 in Japanese Patent Application No. 2014-557492 (with English language translation).
(Continued)

*Primary Examiner* — Jeffrey Pwu
*Assistant Examiner* — William Corum, Jr.
(74) *Attorney, Agent, or Firm* — Oblon, McClelland, Maier & Neustadt, L.L.P.

(57) ABSTRACT

The risk of leakage of secret information caused by leakage of a secret key is reduced. A segmented secret-key storage system segments a secret key SK into segments that can be combined at the time of decryption or at the time of generation of a signature and records the secret-key segments $sk_1, \ldots, sk_N$ in segment storage apparatuses. The
(Continued)

secret-key segments are changed, periodically or under a predetermined condition, to another set of secret-key segments that satisfies a condition for combination. In the segmented secret-key storage system, the secret key SK is not revealed unless the secret-key segments are stolen from all the segment storage apparatuses in an interval between changes made to the secret-key segments. Accordingly, the risk of leakage can be greatly reduced in comparison with the risk of leakage of the secret key from a single apparatus.

13 Claims, 6 Drawing Sheets

(52) U.S. Cl.
CPC ........ *H04L 9/3252* (2013.01); *H04L 63/0435* (2013.01); *H04L 63/061* (2013.01); *H04L 63/0876* (2013.01)

(56) References Cited

FOREIGN PATENT DOCUMENTS

| JP | 2002 91301 | 3/2002 |
| JP | 2004 48479 | 2/2004 |
| JP | 2006 352254 | 12/2006 |
| JP | 2012 150287 | 8/2012 |

OTHER PUBLICATIONS

Extended European Search Report dated Oct. 17, 2016 in Patent Application No. 14740768.8.
International Search Report dated Mar. 18, 2014 in PCT/JP2014/050652 filed Jan. 16, 2014.
Office Action issued May 3, 2017 in Chinese Patent Application No. 201480005193.8 (with English translation).

\* cited by examiner

SEGMENTED SECRET-KEY STORAGE SYSTEM, SEGMENT STORAGE APPARATUS, SEGMENTED SECRET-KEY STORAGE METHOD

TECHNICAL FIELD

The present invention relates to a segmented secret-key storage system, a segment storage apparatus, and a segmented secret-key storage method for securely storing a secret key for use in encryption or authentication.

BACKGROUND ART

Storing a secret key for use in encryption or authentication is an important matter. In modern encryption, preventing secret key leaks is a prerequisite to security. Tamper-resistant hardware for storing keys has been studied to prevent secret keys from leaking, and products such as a trusted platform module (TPM) and a hardware security module (HSM) have been put to practical use.

Another method of preventing secret information from being divulged because of leakage of a secret key is to update the secret key. That type of technique has already been known, as disclosed in Patent literature 1.

PRIOR ART LITERATURE

Patent Literature

Patent literature 1: Japanese Patent Application Laid Open No. 2012-150287

SUMMARY OF THE INVENTION

Problems to be Solved by the Invention

Hardware such as a TPM and an HSM is, however, slow and often does not have sufficient capacity to store a large number of keys. The method of updating secret keys periodically or under a predetermined condition has the risk of leaking secret information from when a secret key has leaked until when that secret key is updated.

In view of these problems, it is an object of the present invention to reduce the risk of leaking secret information caused by leakage of a secret key.

A first segmented secret-key storage system according to the present invention includes an encryption apparatus which uses a public key PK to encrypt plaintext M and outputs ciphertext C; N segment storage apparatuses which record one of secret-key segments $sk_1, \ldots, sk_N$ obtained by segmenting a secret key SK corresponding to the public key PK; and a combining device which obtains the plaintext M corresponding to the ciphertext C. It is first assumed that the relationship $$Dec(C, SK) = Dec(C, g(sk_1, \ldots, sk_N))$$
$$= f(Dec(C, sk_1), \ldots, Dec(C, sk_N))$$

is satisfied, where N is an integer not less than 2, n is an integer between 1 and N, both inclusive, Dec(C, SK) is a symbol representing decryption of the ciphertext C with the secret key SK, $g(sk_1, \ldots, sk_N)$ is a function of $sk_1, \ldots, sk_N$, and $f(m_1, \ldots, m_N)$ is a function of $m_1, \ldots, m_N$. In the first segmented secret-key storage system, each of the segment storage apparatuses includes a decryption unit and a secret-key segment changing unit. The decryption unit uses the secret-key segment $sk_n$ recorded in the segment storage apparatus to obtain a plaintext segment $m_n$ given by $m_n=Dec(C, sk_n)$ and sends the plaintext segment $m_n$ to the combining device. The secret-key segment changing unit obtains a set of secret-key segments $(sk_1', \ldots, sk_N')$ which satisfies $$Dec(C, SK) = Dec(C, g(sk_1', \ldots, sk_N'))$$
$$= f(Dec(C, sk_1'), \ldots, Dec(C, sk_N'))$$

and which differs from $(sk_1, \ldots, sk_N)$ and changes the secret-key segment $sk_n$ recorded in the segment storage apparatus to $sk_n'$. The combining device obtains the plaintext M given by $M=f(m_1, \ldots, m_N)$.

A second segmented secret-key storage system according to the present invention includes an encryption apparatus which uses a public key PK to encrypt plaintext M and outputs ciphertext C, and N segment storage apparatuses which record one of secret-key segments $sk_1, \ldots, sk_N$ obtained by segmenting a secret key SK corresponding to the public key PK. It is first assumed that the relationships $$Dec(C,SK)=Dec(C,g(sk_1, \ldots ,sk_N))$$

$$m_N=Dec(C,sk_N)$$

$$m_n=f(Dec(C,sk_n),m_{n+1})$$

$$M=m_1$$

are satisfied, where N is an integer not less than 2, n is an integer between 1 and N, both inclusive, Dec(C, SK) is a symbol representing decryption of the ciphertext C with the secret key SK, $g(sk_1, \ldots, sk_N)$ is a function of $sk_1, \ldots, sk_N$, and $f(Dec(C, sk_n), m_{n+1})$ is a function of $Dec(C, sk_n)$ and $m_{n+1}$. The segment storage apparatus which records the secret-key segment $sk_N$ includes a decryption unit which uses the secret-key segment $sk_N$ to obtain a plaintext segment $m_N$ given by $m_N=Dec(C, sk_N)$ and sends the plaintext segment $m_N$ to the segment storage apparatus which records the secret-key segment $sk_{n-1}$. The segment storage apparatus which records the secret-key segment $sk_n$ (N is not less than 3, and n is 2 to N−1) includes a decryption unit which uses a plaintext segment $m_{n+1}$ obtained from the segment storage apparatus which records the secret-key segment $sk_{n+1}$ and the secret-key segment $sk_n$ to obtain a plaintext segment $m_n$ given by $m_n=f(Dec(C, sk_n), m_{n+1})$ and sends the plaintext segment $m_n$ to the segment storage apparatus which records the secret-key segment $sk_{n-1}$. The segment storage apparatus which records the secret-key segment $sk_1$ includes a decryption unit which uses a plaintext segment $m_2$ obtained from the segment storage apparatus which records the secret-key segment $sk_2$ and the secret-key segment $sk_1$ to obtain the plaintext M given by $M=f(Dec(C, sk_1), m_2)$. Each of the segment storage apparatuses further includes a secret-key segment changing unit which obtains a set of secret-key segments $(sk_1', \ldots, sk_N')$ which satisfies $$Dec(C,SK)=Dec(C,g(sk_1', \ldots ,sk_N'))$$

$$m_N=Dec(C,sk_N')$$

$$m_n=f(Dec(C,sk_n'),m_{n+1})$$

$$M=m_1$$

and which differs from $(sk_1, \ldots, sk_N)$ and changes the secret-key segment $sk_n$ recorded in the segment storage apparatus to $sk_n'$.

A third segmented secret-key storage system according to the present invention includes N segment storage apparatuses which record one of secret-key segments $sk_1, \ldots, sk_N$ obtained by segmenting a secret key SK, and a combining device which obtains a signature $\Sigma$ for plaintext M. It is first assumed that the relationship $$Sig(M, SK) = Sig(M, g(sk_1, \ldots, sk_N))$$
$$= f(Sig(M, sk_1), \ldots, Sig(M, sk_N))$$

is satisfied, where N is an integer not less than 2, n is an integer between 1 and N, both inclusive, Sig(M, SK) is a symbol representing generation of the signature $\Sigma$ with the secret key SK, $g(sk_1, sk_N)$ is a function of $sk_1, \ldots, sk_N$, and $f(\sigma_1, \ldots, \sigma_N)$ is a function of $\sigma_1, \ldots, \sigma_N$. Each of the segment storage apparatuses includes a generation unit and a secret-key segment changing unit. The generation unit uses the secret-key segment $sk_n$ recorded in the segment storage apparatus to obtain a signature segment $\sigma_n$ given by $\sigma_n$=Sig$(M, sk_n)$ and sends the signature segment $\sigma_n$ to the combining device. The secret-key segment changing unit obtains a set of secret-key segments $(sk_1', \ldots, sk_N')$ which satisfies $$Sig(M, SK) = Sig(M, g(sk_1', \ldots, sk_N'))$$
$$= f(Sig(M, sk_1'), \ldots, Sig(M, sk_N'))$$

and which differs from $(sk_1, \ldots, sk_N)$ and changes the secret-key segment $sk_n$ recorded in the segment storage apparatus to $sk_n'$. The combining device obtains the signature $\Sigma$ given by $\Sigma = f(\sigma_1, \ldots, \sigma_N)$.

A fourth segmented secret-key storage system according to the present invention includes N segment storage apparatuses which record one of secret-key segments $sk_1, \ldots, sk_N$ obtained by segmenting a secret key SK, and generates a signature for plaintext M. It is first assumed that the relationships $$Sig(M,SK)=Sig(M,g(sk_1, \ldots, sk_N))$$

$$\sigma_N=Sig(M,sk_N)$$

$$\sigma_n=f(Sig(M,sk_n),\sigma_{n+1})$$

$$\Sigma=\sigma_1$$

are satisfied, where N is an integer not less than 2, n is an integer between 1 and N, both inclusive, Sig(M, SK) is a symbol representing generation of a signature $\Sigma$ with the secret key SK, $g(sk_1, \ldots, sk_N)$ is a function of $sk_1, \ldots, sk_N$, and $f(Sig(M, sk_n), \sigma_{n+1})$ is a function of $Sig(M, sk_n)$ and $\sigma_{n+1}$. The segment storage apparatus which records the secret-key segment $sk_N$ includes a generation unit which uses the secret-key segment $sk_N$ to obtain a signature segment $\sigma_N$ given by $\sigma_N$=Sig$(M, sk_N)$ and sends the signature segment $\sigma_N$ to the segment storage apparatus which records the secret-key segment $sk_{n-1}$. The segment storage apparatus which records the secret-key segment $sk_n$ (N is not less than 3 and n is 2 to N−1) includes a generation unit which uses a signature segment $\sigma_{n+1}$ obtained from the segment storage apparatus which records the secret-key segment $sk_{n+1}$ and the secret-key segment $sk_n$ to obtain a signature segment $\sigma_n$ given by $\sigma_n = f(Sig(M, sk_n), \sigma_{n+1})$ and sends the signature segment $\sigma_n$ to the segment storage apparatus which records the secret-key segment $sk_{n-1}$. The segment storage apparatus which records the secret-key segment $sk_1$ includes a generation unit which uses a signature segment $\sigma_2$ obtained from the segment storage apparatus which records the secret-key segment $sk_2$ and the secret-key segment $sk_1$ to obtain the signature $\Sigma$ given by $\Sigma = f(Sig(M, sk_1), \sigma_2)$. Each of the segment storage apparatuses further includes a secret-key segment changing unit which obtains a set of secret-key segments $(sk_1', \ldots, sk_N')$ that satisfies $$Sig(M,SK)=Sig(M,g(sk_1', \ldots, sk_N'))$$

$$\sigma_N=Sig(M,sk_N')$$

$$\sigma_n=f(Sig(M,sk_n'),\sigma_{n+1})$$

$$\Sigma=\sigma_1$$

and that differs from $(sk_1, \ldots, sk_N)$ and changes the secret-key segment $sk_n$ recorded in the segment storage apparatus to $sk_n'$.

Effects of the Invention

According to a segmented secret-key storage system of the present invention, the secret key SK will not be revealed unless the secret-key segments are stolen from all the segment storage apparatuses in an interval between changes made to the secret-key segments. Accordingly, the risk of leakage can be greatly reduced in comparison with the risk of leakage of the secret key from a single apparatus.

DETAILED DESCRIPTION OF THE EMBODIMENTS

Now, embodiments of the present invention will be described in detail. Components having identical functions will be denoted by the same reference numbers, and a duplicate description of those components will be avoided.

First Embodiment

Figure 1:
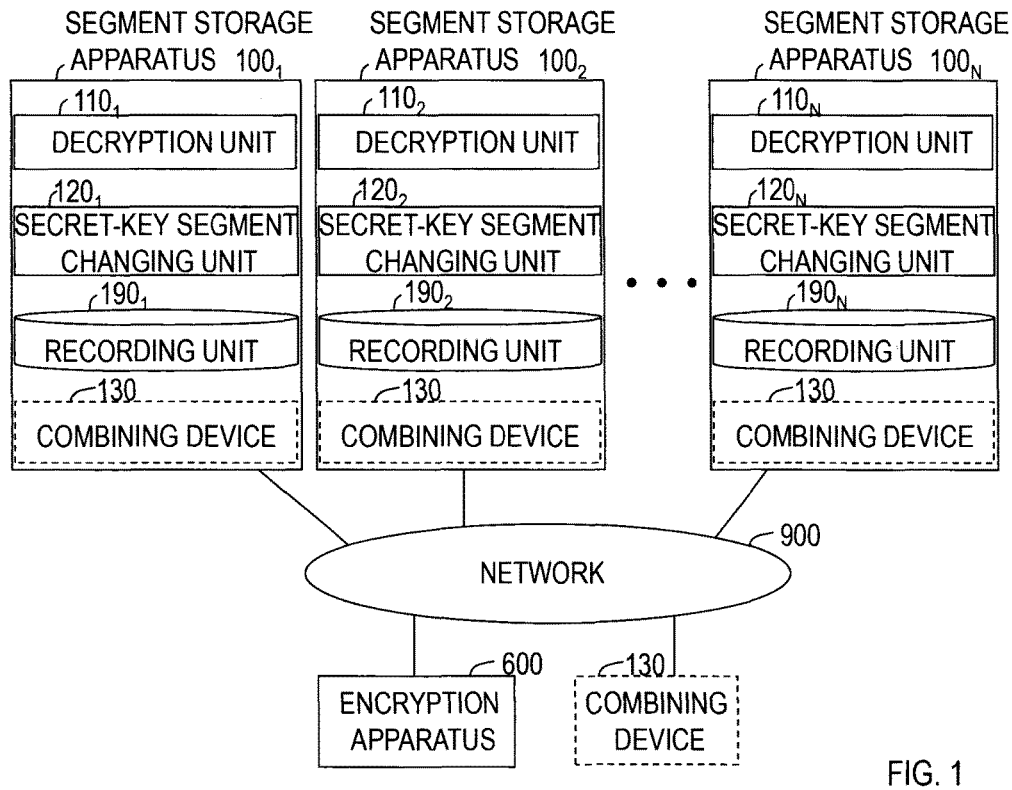
FIG. 1 is a view showing an example of the functional configuration of a segmented secret-key storage system according to a first embodiment.
Figure 2:
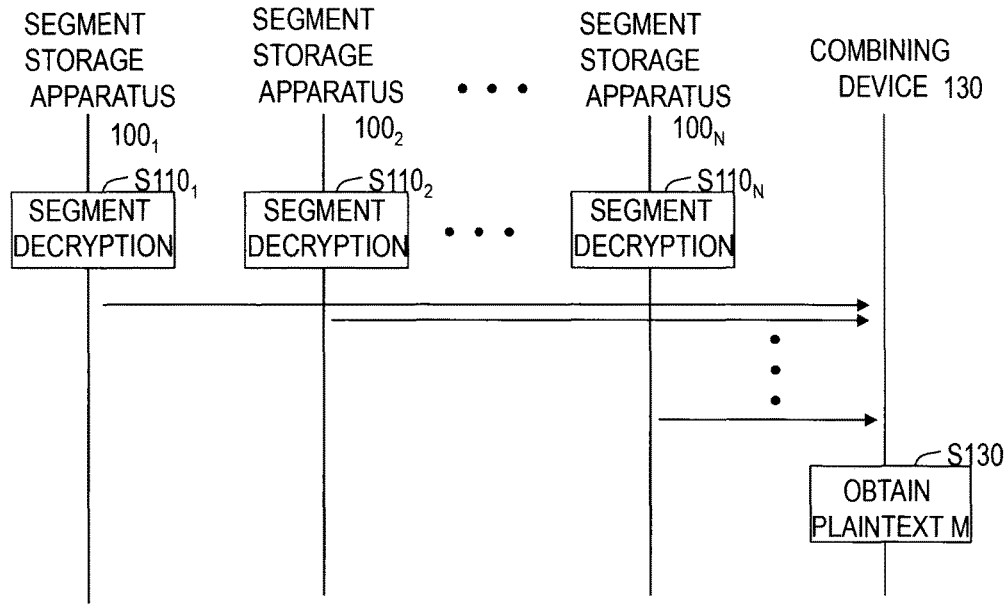
FIG. 2 is a view showing a processing flow of decrypting ciphertext to plaintext in the segmented secret-key storage system in the first embodiment.
Figure 3:
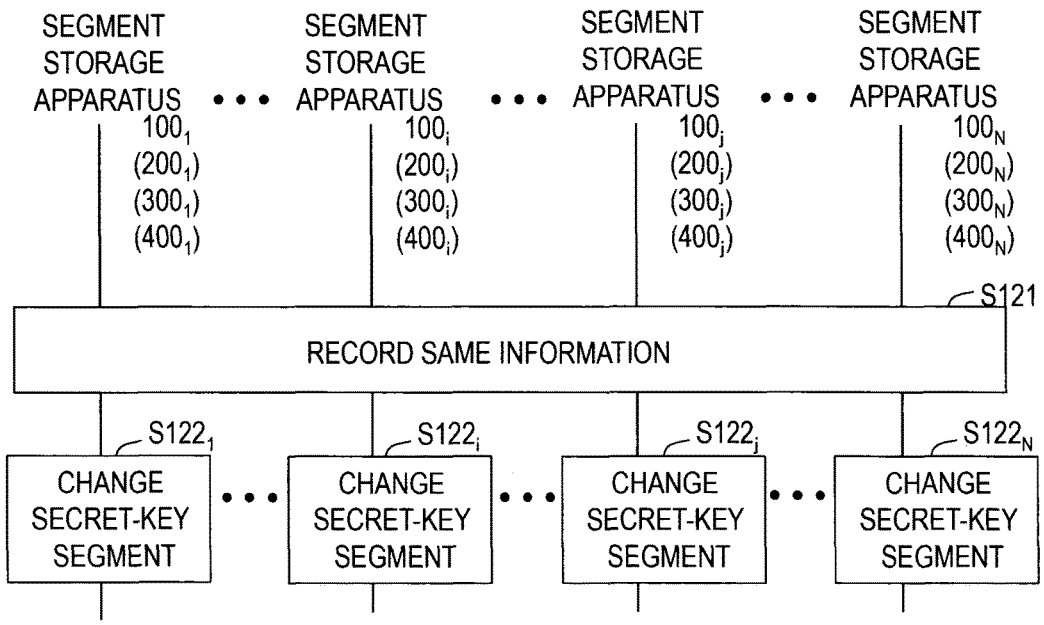
FIG. 3 is a view showing a first example of a processing flow of changing secret-key segments in the present invention.
Figure 4:
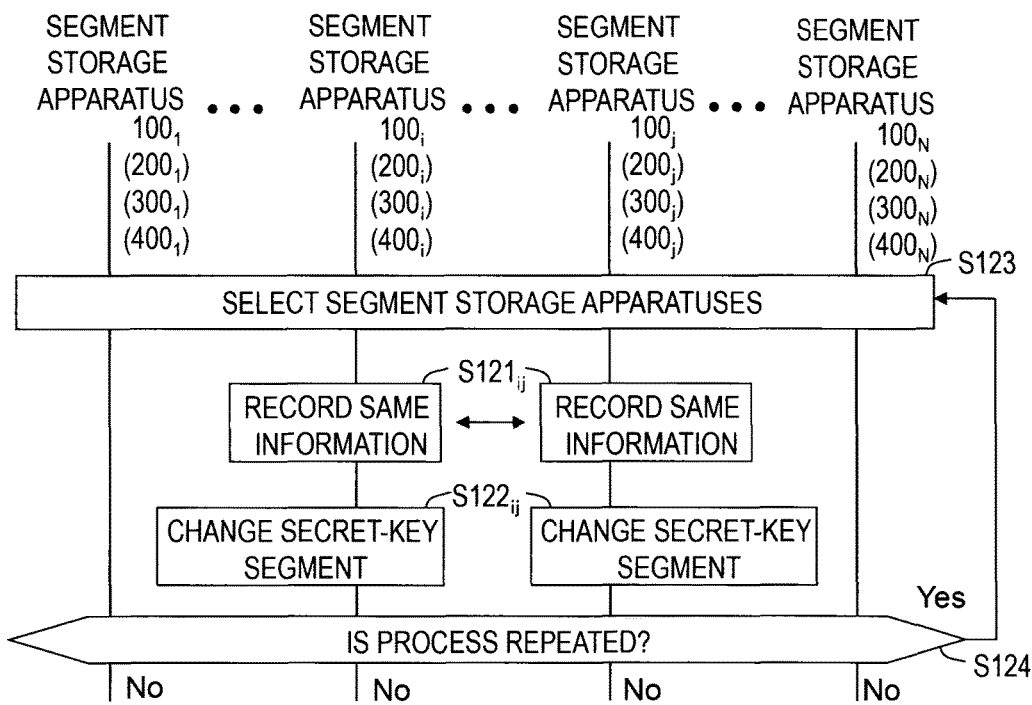
FIG. 4 is a view showing a second example of a processing flow of changing secret-key segments in the present invention.
Figure 5:
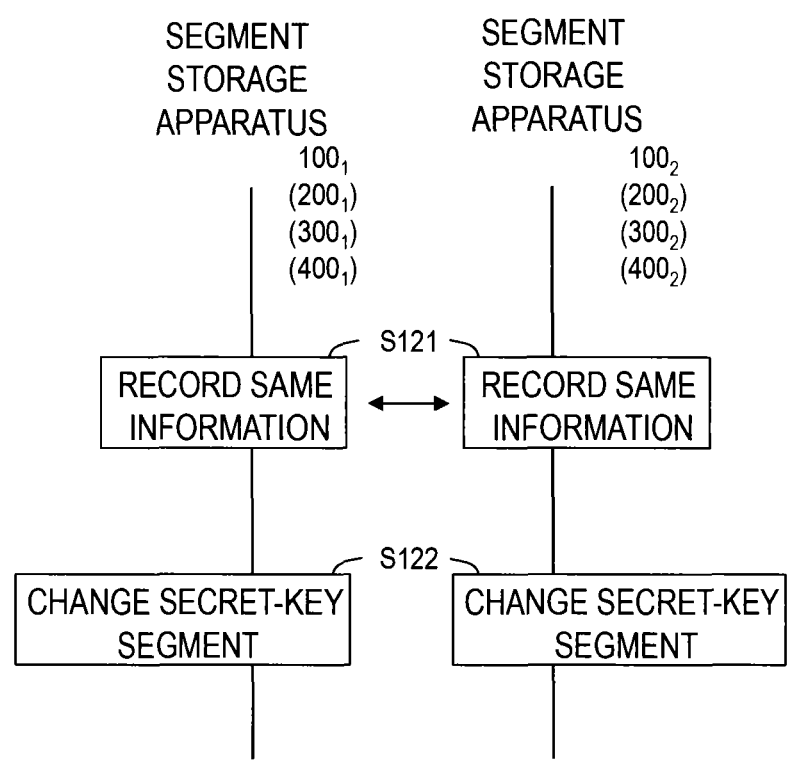
FIG. 5 is a view showing a third example of a processing flow of changing secret-key segments in the present invention.

FIG. 1 shows an example of the functional configuration of a segmented secret-key storage system in a first embodiment. FIG. 2 shows a processing flow of decrypting ciphertext to plaintext, and FIGS. 3 to 5 show examples of a processing flow of changing secret-key segments. The segmented secret-key storage system in the first embodiment includes an encryption apparatus 600, N segment storage apparatuses $100_1, \ldots, 100_N$, and a combining device 130, which are connected by a network 900. The encryption apparatus 600 uses a public key PK to encrypt plaintext M and outputs ciphertext C. The segment storage apparatus $100_n$ records a secret-key segment $sk_n$ among secret-key segments $sk_1, \ldots, sk_N$ obtained by segmenting a secret key SK corresponding to the public key PK. The combining device 130 obtains plaintext M corresponding to the ciphertext C. In FIG. 1, the combining device 130 is represented by a dotted box and is shown in different places. The combining device 130 may be a single independent apparatus or may be disposed in any segment storage apparatus $100_n$. A plurality of apparatuses may include the combining device 130, and the combining device 130 to be used may be selected in each decryption processing flow.

Suppose here that the relationship $$Dec(C, SK) = Dec(C, g(sk_1, \ldots, sk_N))$$
$$= f(Dec(C, sk_1), \ldots, Dec(C, sk_N))$$

holds, where N is an integer not less than 2, n is an integer between 1 and N, both inclusive, Dec(C, SK) is a symbol representing decryption of the ciphertext C with the secret key SK, $g(sk_1, \ldots, sk_N)$ is a function of $sk_1, \ldots, sk_N$, $f(m_1, \ldots, m_N)$ is a function of $m_1, \ldots, m_N$, and ^ is a symbol representing a power.

Each segment storage apparatus $100_n$ includes a decryption unit $110_n$, a secret-key segment changing unit $120_n$, and a recording unit $190_n$. The recording unit $190_n$ records the secret-key segment $sk_n$. The decryption unit $110_n$ uses the secret-key segment $sk_n$ to obtain a plaintext segment $m_n$ given by $m_n = Dec(C, sk_n)$ and sends the plaintext segment $m_n$ to the combining device 130 (S$110_n$). The combining device 130 obtains the plaintext M given by $M = f(m_1, \ldots, m_N)$ (S130).

The secret-key segment changing unit $120_n$ obtains, periodically or under a predetermined condition, a set of secret-key segments $(sk_1', \ldots, sk_N')$ which satisfies $$Dec(C, SK) = Dec(C, g(sk_1', \ldots, sk_N'))$$
$$= f(Dec(C, sk_1'), \ldots, Dec(C, sk_N'))$$

and which differs from $(sk_1, \ldots, sk_N)$, and updates the secret-key segment $sk_n$ recorded in the recording unit $190_n$ to $sk_n'$ (S$120_n$). The predetermined condition can be when decryption has been carried out a given number of times, for example, and can be specified as desired. For example, if functions g and f are defined to satisfy $$Dec(C, SK) = Dec(C, g(sk_1', \ldots, sk_N'))$$
$$= f(Dec(C, sk_1'), \ldots, Dec(C, sk_N'))$$

when the relationship $$SK = sk_1 + \ldots + sk_N$$

holds, the secret-key segment changing unit $120_n$ should obtain a set of secret-key segments $(sk_1', \ldots, sk_N')$ that satisfies $$sk_1' + \ldots + sk_N' = sk_1 + \ldots + sk_N$$

Alternatively, if functions g and f are defined to satisfy $$Dec(C, SK) = Dec(C, g(sk_1', \ldots, sk_N'))$$
$$= f(Dec(C, sk_1'), \ldots, Dec(C, sk_N'))$$

when the relationship $$SK = sk_1 + \ldots + sk_N \bmod q$$

holds, the secret-key segment changing unit $120_n$ should obtain a set of secret-key segments $(sk_1', \ldots, sk_N')$ that satisfies $$sk_1' + \ldots + sk_N' \bmod q = sk_1 + \ldots + sk_N \bmod q$$

In the processing flow of changing the secret-key segments as shown in FIG. 3, $\alpha_n$ is a change part to be applied to the secret-key segment in the segment storage apparatus $100_n$, and the segment storage apparatuses $100_1$ to $100_N$ obtain $\alpha_1$ to $\alpha_N$ that satisfy $$\alpha_1 + \ldots + \alpha_N = 0$$

or $$\alpha_1 + \ldots + \alpha_N \bmod q = 0$$

and the segment storage apparatus $100_n$ obtains $\alpha_n$ (S121). Then, the secret-key segment changing unit $120_n$ changes the secret-key segment according to $$sk_n' = sk_n + \alpha_n$$

(S$122_n$).

In the processing flow of changing the secret-key segments shown in FIG. 4, two segment storage apparatuses $100_i$ and $100_j$ are selected, where i and j are integers between 1 and N, both inclusive, and i≠j. When N=2, i=1 and j=2, or i=2 and j=1. The segment storage apparatuses $100_i$ and $100_j$ record the same change part $\alpha$ (S$121_{ij}$). The secret-key segment changing unit $120_i$ of the segment storage apparatus $100_i$ changes the secret-key segment according to $$sk_i' = sk_i + \alpha$$

and the secret-key segment changing unit $120_j$ of the segment storage apparatus $100_j$ changes the secret-key segment according to $$sk_j' = sk_j - \alpha$$

(S$122_{ij}$). It is checked whether all the segment storage apparatuses have been selected, and it is determined whether to repeat the steps (S124). Through the repetition of the steps, all the secret-key segments are changed. In this way of recording the same value α in two segment storage apparatuses and using α to change the secret-key segments $sk_i$ and $sk_j$ to $sk_1'$ and $sk_j'$, respectively, an authentication key exchange protocol can be used in the step of recording the same value α ($S121_{ij}$). With the authentication key exchange protocol, α is defined by using random numbers generated by both the segment storage apparatus $100_i$ and the segment storage apparatus $100_j$, and neither segment storage apparatus can define α arbitrarily. Consequently, security can be improved.

The processing flow of changing the secret-key segments shown in FIG. 5 is the processing flow in the case where N=2. In that case, there is no need to select the segment storage apparatuses, and the segment storage apparatuses $100_1$ and $100_2$ record the same change part α (S121). The secret-key segment changing unit $120_1$ of the segment storage apparatus $100_1$ changes the secret-key segment according to $$sk_1'=sk_1+\alpha$$

and the secret-key segment changing unit $120_2$ of the segment storage apparatus $100_2$ changes the secret-key segment according to $$sk_2'=sk_2-\alpha$$

(S122). Here, in the step of recording the same value α (S121), the authentication key exchange protocol can be used.

According to the segmented secret-key storage system in the first embodiment, the secret key SK is not revealed unless the secret-key segments are stolen from all the segment storage apparatuses in an interval between changes made to the secret-key segments. Accordingly, the risk of leakage can be greatly reduced in comparison with the risk of leakage of the secret key from a single apparatus.

An existing single decryption apparatus that records the secret key SK can migrate to the segment storage apparatus $100_N$ in the first embodiment through the following procedure: Add the secret-key segment changing unit $120_N$ to the existing decryption apparatus; and connect the segment storage apparatuses $100_1$ to $100_{N-1}$ in which the recording units $190_1$ to $190_{N-1}$ record $sk_1=\ldots=sk_{N-1}=0$, to the network 900. This configuration sets the initial state to $sk_n$=SK and $sk_1=\ldots=sk_{N-1}=0$. Then, when the secret key is segmented by changing the first set of secret-key segments ($sk_1, \ldots, sk_N$), the segmented secret-key storage system in the first embodiment can be configured. It is thus easy to migrate to the segmented secret-key storage system in the first embodiment from the existing system.

Examples of Applicable Encryption Methods

When the segmented secret-key storage system in the first embodiment is implemented, the relationship $$Dec(C, SK) = Dec(C, g(sk_1, \ldots, sk_N))$$
$$= f(Dec(C, sk_1), \ldots, Dec(C, sk_N))$$

must hold. Encryption methods that satisfy the relationship will be indicated below. Other encryption methods are also applicable so long as the relationship is satisfied.

(1) RSA Encryption

In RSA encryption, plaintext M and ciphertext C satisfy the relationships $$C=M^e \bmod q$$

$$M=Dec(C,d)=C^d \bmod q$$

where q is the composite (product) of two large prime numbers, {q, e} is the public key PK, and d is the secret key SK. If functions g and f are defined as $$g(sk_1, \ldots, sk_N)=sk_1+\ldots+sk_N$$

$$f(Dec(C,sk_1), \ldots, Dec(C,sk_N)) = Dec(C,sk_1) \times \ldots \times Dec(C,sk_N) \bmod q$$

and if a set of secret-key segments ($sk_1, \ldots, sk_N$) is selected to satisfy $$d=SK=sk_1+\ldots+sk_N$$

then $$f(Dec(C, sk_1), \ldots, Dec(C, sk_N)) = C^{\wedge}(sk_1 + \ldots + sk_N) \bmod q = M$$

because $$Dec(C,sk_n)=C^{\wedge}sk_n \bmod q$$

Therefore, $$Dec(C, SK) = Dec(C, g(sk_1, \ldots, sk_N))$$
$$= f(Dec(C, sk_1), \ldots, Dec(C, sk_N))$$

holds.

(2) ElGamal Encryption

In ElGamal encryption, when the public key PK is {g, h}, the secret key SK is x, and r is a random number (h=g^x; x and r are integers between 0 and q−1, both inclusive; q is the order of a cyclic group G; g is the generator of the cyclic group G), plaintext M and ciphertext C, which are elements of the cyclic group G, satisfy these relationships $$C=\{C_1, C_2\}=\{g^{\wedge}r, Mh^{\wedge}r\}$$

$$M=Dec(C,x)=C_2/(C_1^{\wedge}x)$$

If functions g and f are defined as $$g(sk_1, \ldots, sk_N)=sk_1+\ldots+sk_N \bmod q$$

$$f(Dec(C,sk_1), \ldots, Dec(C,sk_N)) = Dec(C,sk_1) \times \ldots \times Dec(C,sk_N)/(C_2^{\wedge}(N-1))$$

and if a set of secret-key segments ($sk_1, \ldots, sk_N$) is selected to satisfy $$x=SK=sk_1+\ldots+sk_N \bmod q$$

then $$f(Dec(C, sk_1), \ldots, Dec(C, sk_N)) = $$
$$C_2/(C_1^{\wedge}sk_1) \times \ldots \times C_2/(C_1^{\wedge}sk_N)/(C_2^{\wedge}(N-1)) = $$
$$C_2/(C_1^{\wedge}(sk_1 + \ldots + sk_N)) = M$$

because $$Dec(C,sk_n)=C_2/(C_1^{\wedge}sk_n)$$

Therefore, $$Dec(C, SK) = Dec(C, g(sk_1, \ldots, sk_N))$$
$$= f(Dec(C, sk_1), \ldots, Dec(C, sk_N))$$

holds.

(3) Elliptic Curve ElGamal Encryption

In elliptic curve ElGamal encryption, when the public key PK is {G, H}, the secret key SK is x, and r is a random number (H=xG; x is an integer between 1 and q−1, both inclusive; r is an integer between 0 and q−1, both inclusive; q is the order of a base point G on the elliptic curve), plaintext M and ciphertext C satisfy these relationships $$C=\{C_1, C_2\}=\{rG, M+rH\}$$

$$M=Dec(C,x)=C_2-xC_1$$

If functions g and f are defined as $$g(sk_1, \ldots, sk_N)=sk_1+ \ldots +sk_N \bmod q$$

$$f(Dec(C,sk_1), \ldots, Dec(C,sk_N))=\\ Dec(C,sk_1)+ \ldots +Dec(C,sk_N)-(N-1)C_2$$

and if a set of secret-key segments $(sk_1, \ldots, sk_N)$ is selected to satisfy $$x=SK=sk_1+ \ldots +sk_N \bmod q$$

then $$f(Dec(C, sk_1), \ldots, Dec(C, sk_N)) =$$
$$C_2 - sk_1 C_1 + \ldots + C_2 - sk_N C_1 - (N-1)C_2 =$$
$$C_2 - (sk_1 + \ldots + sk_N)C_1 = M$$

because $$Dec(C, sk)=C_2-Sk_n C_1$$

Therefore, $$Dec(C, SK) = Dec(C, g(sk_1, \ldots, sk_N))$$
$$= f(Dec(C, sk_1), \ldots, Dec(C, sk_N))$$

holds.

(4) ID-Based Encryption

In ID-based encryption, when the public key PK is {$P_{ID}$, P, Q}, the secret key SK is $S_{ID}$, and r is a random number ($S_{ID}=sP_{ID}$; Q=sP; $P_{ID}$ is a point on an elliptic curve of order q transformed from ID by using a hash function; P is the generator of a subgroup on the elliptic curve; s is the master secret key; e(,) represents pairing on the elliptic curve), plaintext M and ciphertext C satisfy the relationships $$C=\{C_1, C_2\}=\{rP, M \times e(P_{ID}, rQ)\}$$

$$M=Dec(C, S_{ID})=C_2 \times e(S_{ID}, C_1)^{-1}$$

If functions g and f are defined as $$g(sk_1, \ldots, sk_N)=sk_1+ \ldots +sk_N \bmod q$$

$$f(Dec(C,sk_1), Dec(C,sk_N))=Dec(C,sk_1) \times \ldots \times\\ Dec(C,sk_N)/(C_2\char`\^(N-1))$$

and if a set of secret-key segments $(sk_1, \ldots, sk_N)$ is selected to satisfy $$S_{ID}=SK=sk_1+ \ldots +sk_N \bmod q$$

then $$f(Dec(C, sk_1), \ldots, Dec(C, sk_N)) =$$
$$C_2 \times e(sk_1, C_1)^{-1} \times \ldots \times C_2 \times e(sk_N, C_1)^{-1}/(C_2 \char`\^(N-1)) =$$
$$C_2 \times e(sk_1 + \ldots + sk_N, C_1)^{-1} = M$$

because $$Dec(C,sk_n)=C_2 \times e(sk_n, C_1)^{-1}$$

Therefore, $$Dec(C, SK) = Dec(C, g(sk_1, \ldots, sk_N))$$
$$= f(Dec(C, sk_1), \ldots, Dec(C, sk_N))$$

holds.

Second Embodiment

Figure 6:
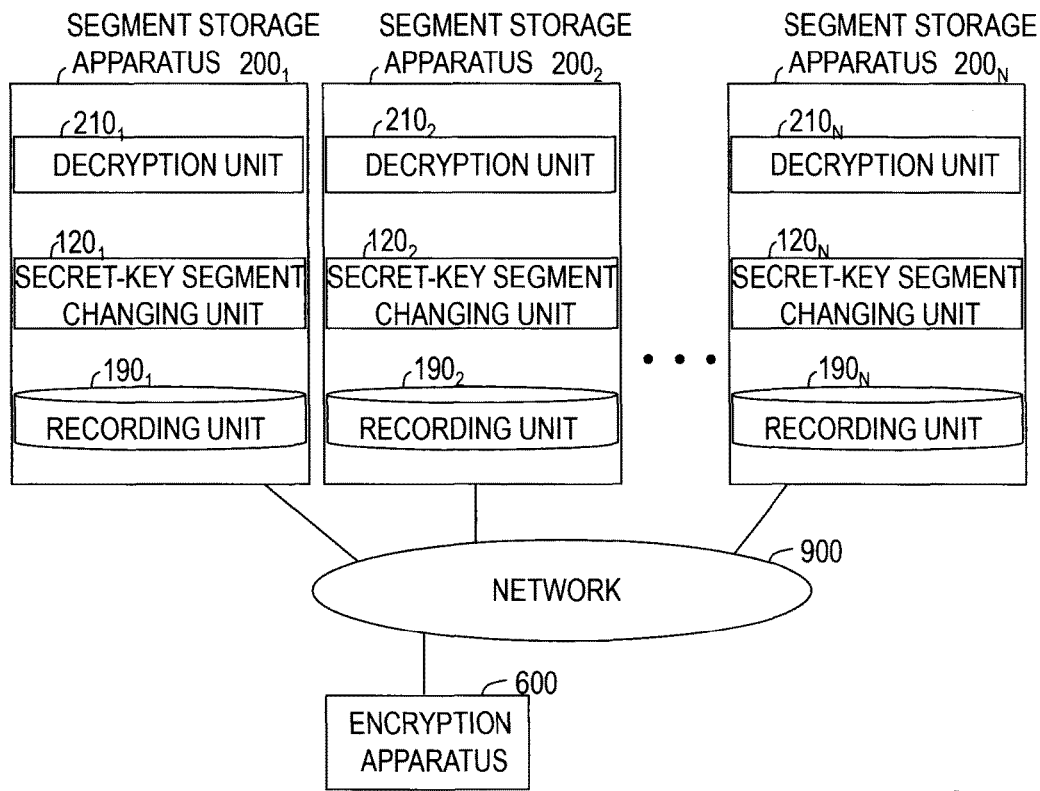
FIG. 6 is a view showing an example of the functional configuration of a segmented secret-key storage system according to a second embodiment.
Figure 7:
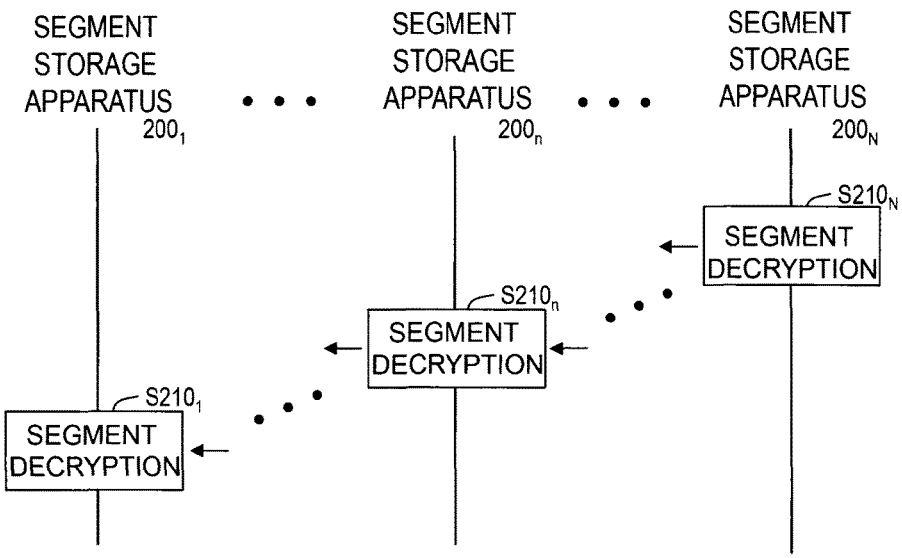
FIG. 7 is a view showing a processing flow of decrypting ciphertext to plaintext in the segmented secret-key storage system in the second embodiment.

FIG. 6 shows an example of the functional configuration of a segmented secret-key storage system in a second embodiment, and FIG. 7 shows a processing flow of decrypting ciphertext to plaintext. Examples of a processing flow of changing secret-key segments are as shown in FIGS. 3 to 5. The segmented secret-key storage system in the second embodiment includes an encryption apparatus 600 and N segment storage apparatuses $200_1, \ldots, 200_N$, which are connected by a network 900. The encryption apparatus 600 uses a public key PK to encrypt plaintext M and outputs ciphertext C. The segment storage apparatus $200_n$ records a secret-key segment $sk_n$ among secret-key segments $sk_1, \ldots, sk_N$ obtained by segmenting a secret key SK corresponding to the public key PK.

Suppose here that the relationships $$Dec(C,SK)=Dec(C,g(sk_1, \ldots, sk_N))$$

$$m_N=Dec(C,sk_N)$$

$$m_n=f(Dec(C,sk_n), m_{n+1})$$

$$M=m_1$$

hold, where N is an integer not less than 2, n is an integer between 1 and N, both inclusive, Dec(C, SK) is a symbol representing decryption of ciphertext C with the secret key SK, $g(sk_1, \ldots, sk_N)$ is a function of $sk_1, \ldots, sk_N$, $f(Dec(C, sk_n), m_{n+1})$ is a function of $Dec(C, sk_n)$ and $m_{n+1}$, and $\char`\^$ is a symbol representing a power.

Each segment storage apparatus $200_n$ includes a decryption unit $210_n$, a secret-key segment changing unit $120_n$, and a recording unit $190_n$. The recording unit $190_n$ records the secret-key segment $sk_n$. The decryption unit $210_N$ of the segment storage apparatus $200_N$ uses the secret-key segment $sk_N$ to obtain a plaintext segment $m_N$ given by $m_N=Dec(C, sk_N)$ and sends the plaintext segment $m_N$ to the segment storage apparatus $200_{N-1}$ ($S210_N$).

The decryption unit $210_n$ of the segment storage apparatus $200_n$ (n=2, . . . , N−1) uses the plaintext segment $m_{n+1}$ obtained from the segment storage apparatus $200_{n+1}$ and the secret-key segment $sk_n$ to obtain a plaintext segment $m_n$ as $m_n=f(Dec(C, sk_n), m_{n+1})$, and sends the plaintext segment $m_n$ to the segment storage apparatus $200_{n-1}$ ($S210_n$). However, when N=2, the segment storage apparatus $200_n$ (n=2, . . . , N−1) is not present.

The decryption unit $210_1$ of the segment storage apparatus $200_1$ uses the plaintext segment $m_2$ obtained from the segment storage apparatus $200_2$ and the secret-key segment $sk_1$ to obtain plaintext M given by $M=f(Dec(C, sk_1), m_2)$ ($S210_1$).

The secret-key segment changing unit $120_n$ obtains, periodically or under a predetermined condition, a set of secret-key segments $(sk_1', \ldots, sk_N')$ which satisfies the relationships $Dec(C,SK)=Dec(C,g(sk_1', \ldots, sk_N'))$ $m_N=Dec(C,sk_N')$ $m_n=f(Dec(C,sk_n'),m_{n+1})$ $M=m_1$ and which differs from $(sk_1, \ldots, sk_N)$, and updates the secret-key segment $sk_n$ recorded in the recording unit $190_n$ to $sk_n'$ (S120$_n$). For example, if functions g and f are defined to satisfy $Dec(C,SK)=Dec(C,g(sk_1, \ldots, sk_N))$ $m_N=Dec(C,sk_N)$ $m_n=f(Dec(C,sk_n),m_{n+1})$ $M=m_1$ when the relationship $SK=sk_1+\ldots+sk_N$ holds, a set of secret-key segments $(sk_1', \ldots, sk_N')$ that satisfies $sk_1'+\ldots+sk_N'=sk_1+\ldots+sk_N$ should be obtained. Alternatively, if functions g and f are defined to satisfy $Dec(C,SK)=Dec(C,g(sk_1, \ldots, sk_N))$ $m_N=Dec(C,sk_N)$ $m_n=f(Dec(C,sk_n),m_{n+1})$ $M=m_1$ when the relationship $SK=sk_1+\ldots+sk_N \bmod q$ holds, a set of secret-key segments $(sk_1', \ldots, sk_N')$ that satisfies $sk_1'+\ldots+sk_N' \bmod q = sk_1+\ldots+sk_N \bmod q$ should be obtained. In those examples, the requirements of the set of segments $(sk_1', \ldots, sk_N')$ are the same as those in the first embodiment, and the flow of changing the set of segments $(sk_1', \ldots, sk_N')$ is the same as in the first embodiment (FIGS. 3 to 5).

According to the segmented secret-key storage system in the second embodiment, the secret key SK is not revealed unless the secret-key segments are stolen from all the segment storage apparatuses in an interval between changes made to the secret-key segments. Accordingly, the risk of leakage can be greatly reduced in comparison with the risk of leakage of the secret key from a single apparatus.

An existing single decryption apparatus that records the secret key SK can migrate to the segment storage apparatus $200_N$ in the second embodiment through the following procedure: Add the secret-key segment changing unit $120_N$ to the existing decryption apparatus; and connect the segment storage apparatuses $200_1$ to $200_{N-1}$ in which the recording units $190_1$ to $190_{N-1}$ record $sk_1=sk_{N-1}=0$, to the network 900. This configuration sets the initial state to $sk_N=SK$ and $sk_1=sk_{N-1}=0$. Then, when the secret key is segmented by changing the first set of secret-key segments $(sk_1, \ldots, sk_N)$, the segmented secret-key storage system in the second embodiment can be configured. It is thus easy to migrate to the segmented secret-key storage system in the second embodiment from the existing system.

Examples of applicable encryption methods

When the segmented secret-key storage system in the second embodiment is implemented, the relationships $Dec(C,SK)=Dec(C,g(sk_1, \ldots, sk_N))$ $m_N=Dec(C,sk_N)$ $m_n=f(Dec(C,sk_n),m_{n+1})$ $M=m_1$ must hold. Encryption methods that satisfy the relationships will be indicated below. Other encryption methods are also applicable so long as the relationships are satisfied.

(1) RSA Encryption

In RSA encryption, plaintext M and ciphertext C satisfy the relationships $C=M\char`\^e \bmod q$ $M=Dec(C,d)=C\char`\^d \bmod q$ where q is the composite (product) of two large prime numbers, $\{q, e\}$ is the public key, and d is the secret key SK. If functions g and f are defined as $g(sk_1, \ldots, sk_N)=sk_1+\ldots+sk_N$ $f(Dec(C,sk),m_{n+1})=Dec(C,sk_n) \times m_{n+1} \bmod q$ and if a set of secret-key segments $(sk_1, \ldots, sk_N)$ is selected to satisfy $d=SK=sk_1+\ldots+sk_N$ then $$m_{N-1} = f(Dec(C, sk_{N-1}), m_N)$$
$$= C\char`\^(sk_{N-1}+sk_N) \bmod q$$

because $m_N=Dec(C,sk_N)=C\char`\^sk_N \bmod q$

This is repeated to provide $$m_n = f(Dec(C, sk_n), m_{n+1})$$
$$= C\char`\^(sk_n + \ldots + sk_N) \bmod q$$

and then $$m_1 = C\char`\^(sk_1 + \ldots + sk_N) \bmod q$$
$$= M$$

Therefore, $Dec(C,SK)=Dec(C,g(sk_1, \ldots, sk_N))$ $m_N=Dec(C,sk_N)$ $m_n=f(Dec(C,sk_n),m_{n+1})$ $M=m_1$ hold.

(2) ElGamal Encryption

In ElGamal encryption, when the public key PK is $\{g, h\}$, the secret key SK is x, and r is a random number ($h=g\hat{\ }x$; x and r are integers between 0 and q−1, both inclusive; q is the order of a cyclic group G; g is the generator of the cyclic group G), plaintext M and ciphertext C, which are elements of the cyclic group G, satisfy these relationships $$C=\{C_1,C_2\}=\{g\hat{\ }r, Mh\hat{\ }r\}$$

$$M=Dec(C,x)=C_2/(C_1\hat{\ }x)$$

If functions g and f are defined as $$g(sk_1,\ldots,sk_N)=sk_1+\ldots+sk_N \bmod q$$

$$f(Dec(C,sk_n),m_{n+1})=(Dec(C,sk_n)\times m_{n+1})/C_2$$

and if a set of secret-key segments $(sk_1, \ldots, sk_N)$ is selected to satisfy $$x=SK=sk_1+\ldots+sk_N \bmod q$$

then $$m_{N-1} = f(Dec(C, sk_{N-1}), m_N)$$
$$= (Dec(C, sk_{N-1}) \times m_N)/C_2$$
$$= (C_2/(C_1\hat{\ }sk_{N-1}) \times C_2/(C_1\hat{\ }sk_N))/C_2$$
$$= C_2/((C_1\hat{\ }sk_{N-1})(C_1\hat{\ }sk_N))$$
$$= C_2/(C_1\hat{\ }(sk_{N-1}+sk_N))$$

because $$m_N=Dec(C,sk_N)=C_2/(C_1\hat{\ }sk_N)\bmod q$$

This is repeated to provide $$m_n = f(Dec(C, sk_n), m_{n+1})$$
$$= C_2/(C_1\hat{\ }(sk_n + \ldots + sk_N))$$

and then $$m_1 = C_2/(C_1\hat{\ }(sk_1 + \ldots + sk_N))$$
$$= M$$

Therefore, $$Dec(C,SK)=Dec(C,g(sk_1,\ldots,sk_N))$$

$$m_N=Dec(C,sk_N)$$

$$m_n=f(Dec(C,sk_n),m_{n+1})$$

$$M=m_1$$

hold.

(3) Elliptic Curve ElGamal Encryption

In elliptic curve ElGamal encryption, when the public key PK is $\{G, H\}$, the secret key SK is x, and r is a random number (H=xG; x is an integer between 1 and q−1, both inclusive; r is an integer between 0 and q−1, both inclusive, q is the order of a base point G on the elliptic curve), plaintext M and ciphertext C satisfy these relationships $$C=\{C_1,C_2\}=\{rG, M+rH\}$$

$$M=Dec(C,x)=C_2-XC_1$$

If functions g and f are defined as $$g(sk_1,\ldots,sk_N)=sk_1+\ldots+sk_N \bmod q$$

$$f(Dec(C,sk_n),m_{n+1})=Dec(C,sk_n)+m_{n+1}C_2$$

and if a set of secret-key segments $(sk_1, \ldots, sk_N)$ is selected to satisfy $$x=SK=sk_1+\ldots+sk_N \bmod q$$

then $$m_{N-1} = f(Dec(C, sk_{N-1}), m_N)$$
$$= Dec(C, sk_{N-1}) + m_N - C_2$$
$$= C_2 - sk_{N-1}C_1 + C_2 - sk_N C_1 - C_2$$
$$= C_2 - sk_{N-1}C_1 - sk_N C_1$$
$$= C_2 - (sk_{N-1} + sk_N)C_1$$

because $$m_N=Dec(C,sk_N)=C_2-sk_N C_1$$

This is repeated to provide $$m_n = f(Dec(C, sk_n), m_{n+1})$$
$$= C_2 - (sk_n + \ldots + sk_N)C_1$$

and then $$m_1 = C_2 - (sk_1 + \ldots + sk_N)C_1$$
$$= M$$

Therefore, $$Dec(C,SK)=Dec(C,g(sk_1,\ldots,sk_N))$$

$$m_N=Dec(C,sk_N)$$

$$m_n=f(Dec(C,sk_n),m_{n+1})$$

$$M=m_1$$

hold.

(4) ID-Based Encryption

In ID-based encryption, when the public key PK is $\{P_{ID}, P, Q\}$, the secret key SK is $S_{ID}$, and r is a random number ($S_{ID}=sP_{ID}$; Q=sP; $P_{ID}$ is a point on an elliptic curve of order q transformed from ID by using a hash function; P is the generator of a subgroup on the elliptic curve; s is the master secret key; e(,) represents pairing on the elliptic curve), plaintext M and ciphertext C satisfy these relationships $$C=\{C_1,C_2\}=\{rP, M\times e(P_{ID}, rQ)\}$$

$$M=Dec(C,S_{ID})=C_2\times e(S_{ID},C_1)^{-1}$$

If functions g and f are defined as $$g(sk_1,\ldots,sk_N)=sk_1+\ldots+sk_y \bmod q$$

$$f(Dec(C,sk_n),m_{n+1})=(Dec(C,sk_n)\times m_{n+1})/C_2$$

and if a set of secret-key segments $(sk_1, \ldots, sk_y)$ is selected to satisfy $$S_{ID}=SK=sk_1+\ldots+sk_y \bmod q$$

then $$m_{N-1} = f(Dec(C, sk_{N-1}), m_N)$$
$$= (Dec(C, sk_{N-1}) + m_N)/C_2$$
$$= (C_2 \times e(sk_{N-1}, C_1)^{-1} \times C_2 \times e(sk_N, C_1)^{-1})/C_2$$
$$= C_2 \times e(sk_{N-1}, C_1)^{-1} e(sk_N, C_1)^{-1}$$
$$= C_2 \times e(sk_{N-1} + sk_N, C_1)^{-1}$$

because $$m_N = Dec(C, sk_N) = C_2 \times e(sk_N, C_1)^{-1}$$

This is repeated to provide $$m_n = f(Dec(C, sk_n), m_{n+1})$$
$$= C_2 \times e(sk_n + \ldots + sk_N, C_1)^{-1}$$

and then $$m_1 = C_2 \times e(sk_1 + \ldots + sk_N, C_1)^{-1}$$
$$= M$$

Therefore, $$Dec(C,SK) = Dec(C, g(sk_1, \ldots, sk_N))$$

$$m_N = Dec(C, sk_N)$$

$$m_n = f(Dec(C, sk_n), m_{n+1})$$

$$M = m_1$$

hold.

Third Embodiment

Figure 8:
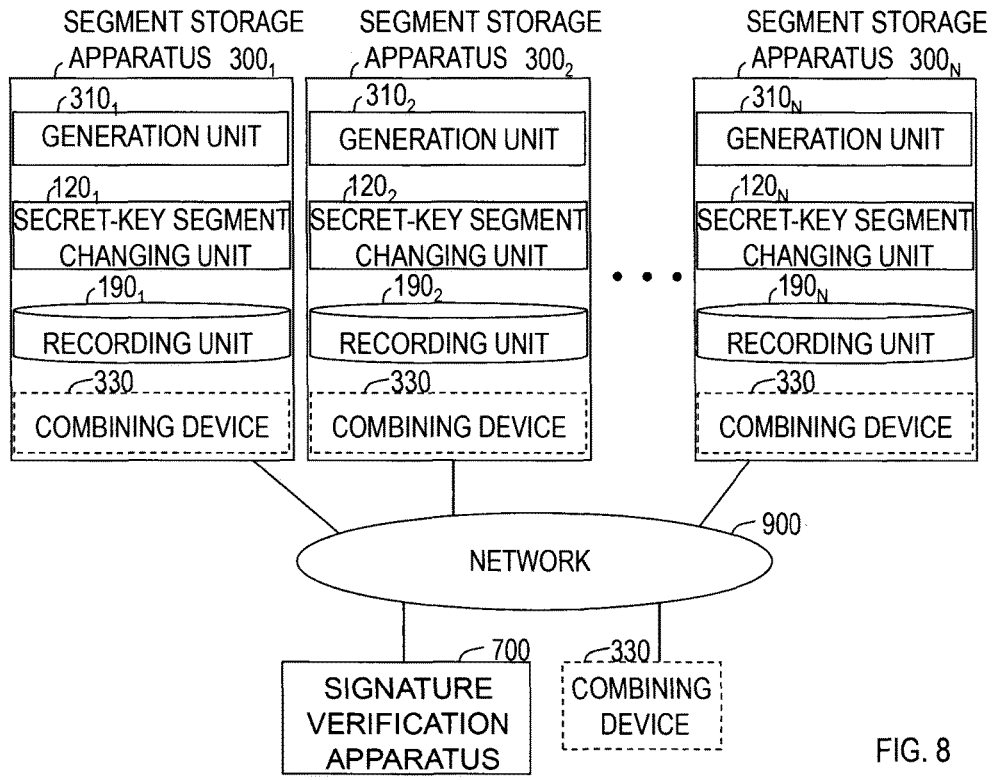
FIG. 8 is a view showing an example of the functional configuration of a segmented secret-key storage system according to a third embodiment.
Figure 9:
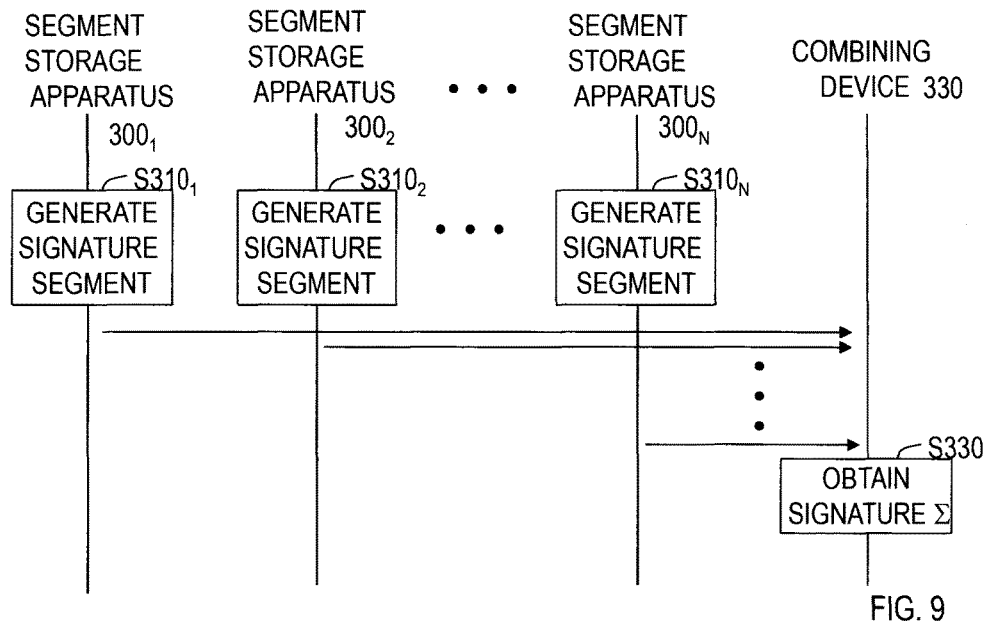
FIG. 9 is a view showing a processing flow of generating a signature in the segmented secret-key storage system in the third embodiment.

FIG. 8 shows an example of the functional configuration of a segmented secret-key storage system in a third embodiment, and FIG. 9 shows a processing flow of generating a signature. Examples of a processing flow of changing secret-key segments are as shown in FIGS. 3 to 5. The segmented secret-key storage system in the third embodiment includes a signature verification apparatus 700, N segment storage apparatuses $300_1, \ldots, 300_N$, and a combining device 330, which are connected by a network 900. The signature verification apparatus 700 is an apparatus for verifying the validity of a generated signature $\Sigma$. The segment storage apparatus $300_n$ records a secret-key segment $sk_n$ among secret-key segments $sk_1, \ldots, sk_N$ obtained by segmenting a secret key SK corresponding to a public key PK. The combining device 330 obtains the signature $\Sigma$ for the plaintext M. In FIG. 8, the combining device 330 is represented by a dotted box and is shown in different places. The combining device 330 may be a single independent apparatus or may be disposed in any segment storage apparatus $300n$. A plurality of apparatuses may include the combining device 330, and the combining device 330 to be used may be selected in each signature processing flow.

Suppose that the following relationship holds $$Sig(M, SK) = Sig(M, g(sk_1, \ldots, sk_N))$$
$$= f(Sig(M, sk_1), \ldots, Sig(M, sk_N))$$

where N is an integer not less than 2, n is an integer between 1 and N, both inclusive, $Sig(M, SK)$ is a symbol representing generation of the signature $\Sigma$ with the secret key SK, $g(sk_1, \ldots, sk_N)$ is a function of $sk_1, \ldots, sk_N$, $f(\sigma_1, \ldots, \sigma_N)$ is a function of $\sigma_1, \ldots, \sigma_N$, and $\char`\^$ is a symbol representing a power.

Each segment storage apparatus $300_n$ includes a generation unit $310_n$, a secret-key segment changing unit $120_n$, and a recording unit $190_n$. The recording unit $190_n$ records the secret-key segment $sk_n$. The generation unit $310_n$ uses the secret-key segment $sk_n$ to obtain a signature segment $\sigma_n$ given by $\sigma_n = Sig(M, sk_n)$ and sends the signature segment $\sigma_n$ to the combining device 330 (S310). The combining device 330 obtains the signature $\Sigma$ according to $\Sigma = f(\sigma_1, \ldots, \sigma_y)$ (S330).

The secret-key segment changing unit $120_n$ obtains, periodically or under a predetermined condition, a set of secret-key segments $(sk_1', \ldots, sk_N')$ which satisfies $$Sig(M, SK) = Sig(M, g(sk_1', \ldots, sk_N'))$$
$$= f(Sig(M, sk_1'), \ldots, Sig(M, sk_N'))$$

and which differs from $(sk_1, \ldots, sk_N)$, and updates the secret-key segment $sk_n$ recorded in the recording unit $190_n$ to $sk_n'$ (S120$_n$). For example, if functions g and f are defined to satisfy $$Sig(M, SK) = Sig(M, g(sk_1, \ldots, sk_N))$$
$$= f(Sig(M, sk_1), \ldots, Sig(M, sk_N))$$

when the relationship $$SK = sk_1 + \ldots + sk_N$$

holds, a set of secret-key segments $(sk_1', \ldots, sk_N')$ that satisfies $$sk_1' + \ldots + sk_N' = sk_1 + \ldots + sk_N$$

should be obtained. Alternatively, if functions g and f are defined to satisfy $$Sig(M, SK) = Sig(M, g(sk_1, \ldots, sk_N))$$
$$= f(Sig(M, sk_1), \ldots, Sig(M, sk_N))$$

when the relationship $$SK = sk_1 + \ldots + sk_N \bmod q$$

holds, a set of secret-key segments $(sk_1', \ldots, sk_N')$ that satisfies $$sk_1' + \ldots + sk_N' \bmod q = sk_1 + \ldots + sk_N \bmod q$$

should be obtained. In those examples, the requirements of the set of segments $(sk_1', \ldots, sk_N')$ are the same as those in the first embodiment, and the flow of changing the set of segments $(sk_1', \ldots, sk_N')$ is the same as in the first embodiment (FIGS. 3 to 5).

According to the segmented secret-key storage system in the third embodiment, the secret key SK is not revealed unless the secret-key segments are stolen from all the segment storage apparatuses in an interval between changes made to the secret-key segments. Accordingly, the risk of leakage can be greatly reduced in comparison with the risk of leakage of the secret key from a single apparatus.

An existing single signature generation apparatus that records the secret key SK can migrate to the segment storage apparatus $300_N$ in the third embodiment through the following procedure: Add the secret-key segment changing unit $120_N$ to the existing signature generation apparatus; and connect the segment storage apparatuses $300_1$ to $300_{N-1}$ in which the recording units $190_1$ to $190_{N-1}$ record $sk_1= \ldots =sk_{N-1}=0$, to the network 900. This configuration sets the initial state to $sk_N=SK$ and $sk_1= \ldots =sk_{N-1}=0$. Then, when the secret key is segmented by changing the first set of secret-key segments $(sk_1, \ldots, sk_N)$, the segmented secret-key storage system in the third embodiment can be configured. It is thus easy to migrate to the segmented secret-key storage system in the third embodiment from the existing system.

Examples of Applicable Signature Methods

When the segmented secret-key storage system in the third embodiment is implemented, the relationship $$Sig(M, SK) = Sig(M, g(sk_1, \ldots, sk_N))$$
$$= f(Sig(M, sk_1), \ldots, Sig(M, sk_N))$$

must hold. As for an RSA signature, for example, plaintext M and a signature $\Sigma$ satisfy the relationships $$\Sigma = Sig(M,d) = M\hat{\ }d \bmod q \text{ (Signature generation)}$$

$$M = E\hat{\ }e \bmod q \text{ (Signature verification)}$$

where q is the composite (product) of two large prime numbers, $\{q, e\}$ is the public key PK, and d is the secret key SK. If functions g and f are defined as $$g(sk_1, \ldots, sk_N) = sk_1 + \ldots + sk_N$$

$$f(Sig(M,sk_1), \ldots, Sig(M,sk_N)) = Sig(M,sk_1) \times \ldots \times Sig(M,sk_N) \bmod q$$

and if a set of secret-key segments $(sk_1, \ldots, sk_N)$ is selected to satisfy $$d = SK = sk_1 + \ldots + sk_N$$

then $$f(Sig(M, sk_1), \ldots, Sig(M, sk_N)) = M\hat{\ }(sk_1 + \ldots + sk_N) \bmod q = \Sigma$$

because $$Sig(M,sk_n) = M\hat{\ }sk_n$$

Therefore, $$Sig(M, SK) = Sig(M, g(sk_1, \ldots, sk_N))$$
$$= f(Sig(M, sk_1), \ldots, Sig(M, sk_N))$$

holds. This description does not limit the signature method that implements this embodiment. Other signature methods are also applicable so long as the conditions given above are satisfied.

Fourth Embodiment

Figure 10:
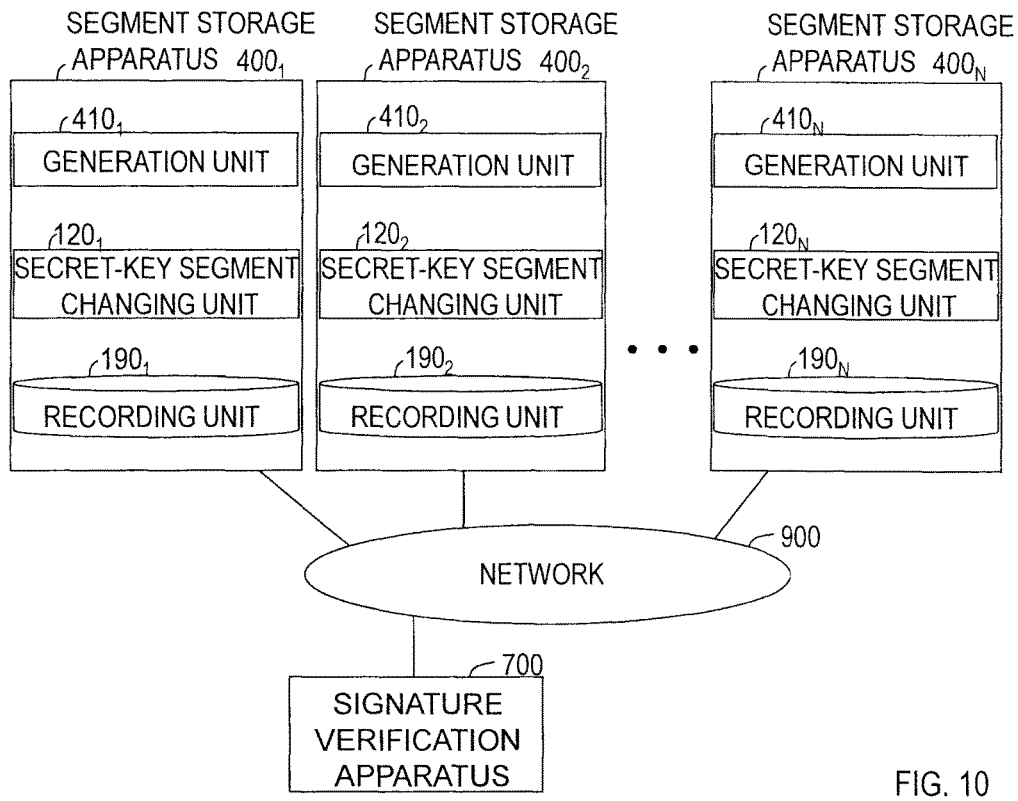
FIG. 10 is a view showing an example of the functional configuration of a segmented secret-key storage system according to a fourth embodiment.
Figure 11:
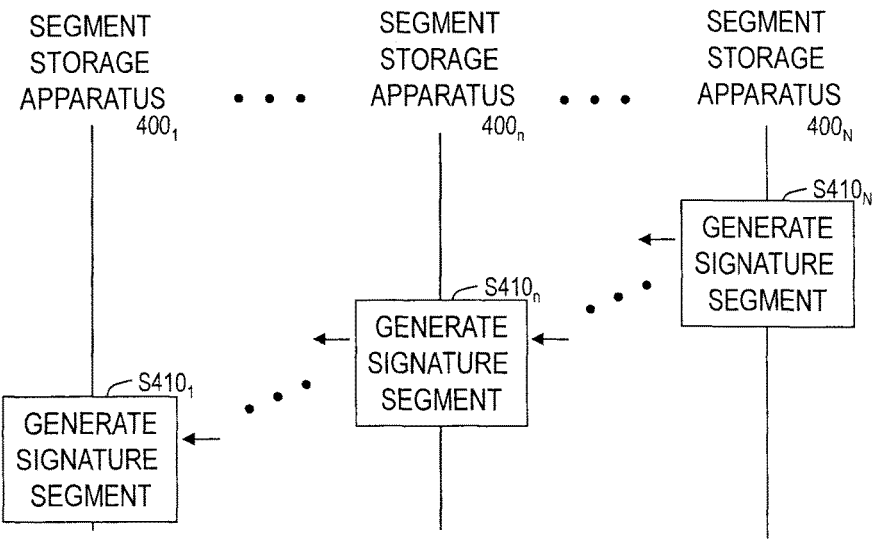
FIG. 11 is a view showing a processing flow of generating a signature in the segmented secret-key storage system in the fourth embodiment.

FIG. 10 shows an example of the functional configuration of a segmented secret-key storage system in a fourth embodiment, and FIG. 11 shows a processing flow of generating a signature. Examples of a processing flow of changing secret-key segments are as shown in FIGS. 3 to 5. The segmented secret-key storage system in the fourth embodiment includes a signature verification apparatus 700 and N segment storage apparatuses $400_1, \ldots, 400_N$, which are connected by a network 900. The signature verification apparatus 700 is an apparatus for verifying the validity of a generated signature $\Sigma$. The segment storage apparatus $400_n$ records a secret-key segment $sk_n$ among secret-key segments $sk_1, \ldots, sk_N$ obtained by segmenting a secret key SK corresponding to a public key PK.

Suppose that the following relationships hold $$Sig(M,SK) = Sig(M,g(sk_1, \ldots, sk_N))$$

$$\sigma_N = Sig(M,sk_N).$$

$$\sigma_n = f(Sig(M,sk_n),\sigma_{n+1})$$

$$\Sigma = \sigma_1$$

where N is an integer not less than 2, n is an integer between 1 and N, both inclusive, Sig(M, SK) is a symbol representing generation of a signature $\Sigma$ with the secret key SK, $g(sk_1, \ldots, sk_N)$ is a function of $sk_1, \ldots, sk_N$, $f(Sig(M, sk_n), \sigma_{n+1})$ is a function of $Sig(M, sk_n)$ and $\sigma_{n+1}$, and $\hat{\ }$ is a symbol representing a power.

Each segment storage apparatus $400_n$ includes a generation unit $410_n$, a secret-key segment changing unit $120_n$, and a recording unit $190_n$. The recording unit $190_n$ records a secret-key segment $sk_n$. The generation unit $410_N$ of the segment storage apparatus $400_N$ uses the secret-key segment $sk_N$ to obtain a signature segment $\sigma_N$ given by $\sigma_N=Sig(M, sk_N)$ and sends the signature segment $\sigma_N$ to the segment storage apparatus $400_{N-1}$ ($S410_N$).

The generation unit $410_n$ of the segment storage apparatus $400_n$ (n=2, ..., N−1) uses the signature segment $\sigma_{n+1}$ obtained from the segment storage apparatus $400_{n+1}$ and the secret-key segment $sk_n$ to obtain a signature segment $\sigma_n$ given by $\sigma_n=f(Sig(M, sk_n), \sigma_{n+1})$, and sends the signature segment $\sigma_n$ to the segment storage apparatus $400_{n-1}$ ($S410_n$). However, when N=2, the segment storage apparatus $400_n$ (n=2, ..., N−1) is not present. The segment storage apparatus $400_1$ uses the signature segment $\sigma_2$ obtained from the segment storage apparatus $400_2$ and the secret-key segment $sk_1$ to obtain a signature $\Sigma$ given by $\Sigma=f(Sig(M, sk_1), \sigma_2)$ ($S410_1$).

The secret-key segment changing unit $120_n$ obtains, periodically or under a predetermined condition, a set of secret-key segments $(sk_1', sk_N')$ which satisfies the relationships $$Sig(M,SK) = Sig(M,g(sk_1', \ldots, sk_N'))$$

$$\sigma_N = Sig(M,sk_N')$$

$$\sigma_n = f(Sig(M,sk_n'),\sigma_{n+1})$$

$$\Sigma = \sigma_1$$

and which differs from $(sk_1, \ldots, sk_N)$, and updates the secret-key segment $sk_n$ recorded in the recording unit $190_n$ to $sk_n'$ (S120$_n$). For example, if functions g and f are defined to satisfy $$Sig(M,SK)=Sig(M,g(sk_1,\ldots,sk_N))$$

$$\sigma_N=Sig(M,sk_N)$$

$$\sigma_n=f(Sig(M,sk_n),\sigma_{n+1})$$

$$\Sigma=\sigma_1$$

when the relationship $$SK=sk_1+\ldots+sk_N$$

holds, a set of secret-key segments $(sk_1', \ldots, sk_N')$ that satisfies $$sk_1'+\ldots+sk_N'=sk_1+\ldots+sk_N$$

should be obtained. Alternatively, if functions g and f are defined to satisfy $$Sig(M,SK)=Sig(M,g(sk_1,\ldots,sk_N))$$

$$\sigma_N=Sig(M,sk_N)$$

$$\sigma_n=f(Sig(M,sk_n),\sigma_{n+1})$$

$$\Sigma=\sigma_1$$

when the relationship $$SK=sk_1+\ldots+sk_N \bmod q$$

holds, a set of secret-key segments $(sk_1', sk_N')$ that satisfies $$sk_1'+\ldots+sk_N' \bmod q = sk_1+\ldots+sk_N \bmod q$$

should be obtained. In those examples, the requirements of the set of segments $(sk_1', \ldots, sk_N')$ are the same as those in the first embodiment, and the flow of changing the set of segments $(sk_1', \ldots, sk_N')$ is the same as in the first embodiment (FIGS. 3 to 5).

According to the segmented secret-key storage system in the fourth embodiment, the secret key SK is not revealed unless the secret-key segments are stolen from all the segment storage apparatuses in an interval between changes made to the secret-key segments. Accordingly, the risk of leakage can be greatly reduced in comparison with the risk of leakage of the secret key from a single apparatus.

An existing single signature generation apparatus that records the secret key SK can migrate to the segment storage apparatus 400$_N$ in the fourth embodiment through the following procedure: Add the secret-key segment changing unit 120$_N$ to the existing signature generation apparatus; and connect the segment storage apparatuses 400$_1$ to 400$_{N-1}$ in which the recording units 190$_1$ to 190$_{N-1}$ record $sk_1=\ldots=sk_N=0$, to the network 900. This configuration sets the initial state to $sk_N=SK$ and $sk_1=\ldots=sk_{N-1}=0$. Then, when the secret key is segmented by changing the first set of secret-key segments $(sk_1, \ldots, sk_N)$, the segmented secret-key storage system in the fourth embodiment can be configured. It is thus easy to migrate to the segmented secret-key storage system in the fourth embodiment from the existing system.

Examples of applicable signature methods

When the segmented secret-key storage system in the fourth embodiment is implemented, the relationships $$Sig(M,SK)=Sig(M,g(sk_1,\ldots,sk_n))$$

$$\sigma_n=f(Sig(M,sk_n),\sigma_{n+1})$$

must hold. As for an RSA signature, for example, plaintext M and signature $\Sigma$ satisfy the relationships $$\Sigma=Sig(M,d)=M\hat{}d \bmod q \text{ (Signature generation)}$$

$$M=\Sigma\hat{}e \bmod q \text{ (Signature verification)}$$

where q is the composite (product) of two large prime numbers, $\{q, e\}$ is the public key, and d is the secret key SK. If functions g and f are defined as $$g(sk_1,\ldots,sk_N)=sk_1+\ldots+sk_N$$

$$f(Sig,(M,sk_n),\sigma_{n+1})=Sig(M,sk_n)\times\sigma_{n+1} \bmod q$$

and if a set of secret-key segments $(sk_1, \ldots, sk_N)$ is selected to satisfy $$d=SK=sk_1+\ldots+sk_N$$

then $$\sigma_{N-1} = f(Sig(M, sk_{N-1}), \sigma_{n+1N})$$
$$= M\hat{}(sk_{N-1}+sk_N) \bmod q$$

because $$\sigma_N=Sig(M,sk_N)=M\hat{}sk_N \bmod q$$

Therefore, $$\sigma_n = f(Sig(M, sk_n), \sigma_{n+1})$$
$$= M\hat{}(sk_n+\ldots+sk_N) \bmod q$$

and then $$m_1 = M\hat{}(sk_1+\ldots+sk_N) \bmod q$$
$$= \Sigma$$

As a result, $$Sig(M,SK)=Sig(M,g(sk_1,\ldots,sk_N))$$

$$\sigma_N=Sig(M,sk_n)$$

$$\sigma_n=f(Sig(M,sk_n),\sigma_{n+1})$$

$$\Sigma=\sigma_1$$

hold. The description does not limit the signature method that implements this embodiment. Other signature methods are also applicable so long as the conditions given above are satisfied.

Program, Recording Medium

Each type of processing described above may be executed not only time sequentially according to the order of description but also in parallel or individually when necessary or according to the processing capabilities of the apparatuses that execute the processing. Appropriate changes can be made to the above embodiments without departing from the scope of the present invention.

When the configurations described above are implemented by a computer, the processing details of the functions that should be provided by each apparatus are described in a program. When the program is executed by a computer, the processing functions described above are implemented on the computer.

The program containing the processing details can be recorded in a computer-readable recording medium. The computer-readable recording medium can be any type of medium, such as a magnetic storage device, an optical disc, a magneto-optical recording medium, or a semiconductor memory.

This program is distributed by selling, transferring, or lending a portable recording medium such as a DVD or a CD-ROM with the program recorded on it, for example. The program may also be distributed by storing the program in a storage unit of a server computer and transferring the program from the server computer to another computer through the network.

A computer that executes this type of program first stores the program recorded on the portable recording medium or the program transferred from the server computer in its storage unit. Then, the computer reads the program stored in its storage unit and executes processing in accordance with the read program. In a different program execution form, the computer may read the program directly from the portable recording medium and execute processing in accordance with the program, or the computer may execute processing in accordance with the program each time the computer receives the program transferred from the server computer. Alternatively, the above-described processing may be executed by a so-called application service provider (ASP) service, in which the processing functions are implemented just by giving program execution instructions and obtaining the results without transferring the program from the server computer to the computer. The program of this form includes information that is provided for use in processing by the computer and is treated correspondingly as a program (something that is not a direct instruction to the computer but is data or the like that has characteristics that determine the processing executed by the computer).

In the description given above, the apparatuses are implemented by executing the predetermined programs on the computer, but at least a part of the processing details may be implemented by hardware.

DESCRIPTION OF REFERENCE NUMERALS

100, 200, 300, 400: Segment storage apparatus
110, 210: Decryption unit
120: Secret-key segment changing unit
130, 330: Combining device
190: Recording unit
310, 410: Generation unit
600: Encryption apparatus
700: Signature verification apparatus
900: Network

What is claimed is:

1. A segment storage apparatus of N segment storage apparatuses, for storing secret key segments for reducing the risk of leaking secret information caused by secret key leakage, which respectively record secret-key segments $sk_1, \ldots, sk_N$ obtained by segmenting a secret key SK corresponding to a public key PK, in a segmented secret-key storage system,
the relationship $$Dec(C, SK) = Dec(C, g(sk_1, \ldots, sk_N))$$
$$= f(Dec(C, sk_1), \ldots, Dec(C, sk_N))$$

being satisfied, where N is an integer not less than 2, n is an integer between 1 and N, both inclusive, Dec(C, SK) is a symbol representing decryption of the ciphertext C with the secret key SK, $g(sk_1, \ldots, sk_N)$ is a function of $sk_1, \ldots, sk_N$, and $f(m_1, \ldots, m_N)$ is a function of $m_1, \ldots, m_N$;
the segment storage apparatuses comprising:
a decryption unit which uses the secret-key segment $sk_n$ recorded in the segment storage apparatus to obtain a plaintext segment $m_n$ given by $m_n = Dec(C, sk_n)$ and sends the plaintext segment $m_n$ to a combining device; and
a secret-key segment changing unit which obtains a set of secret-key segments $(sk_1', \ldots, sk_N')$ that satisfies $$Dec(C, SK) = Dec(C, g(sk_1', \ldots, sk_N'))$$
$$= f(Dec(C, sk_1'), \ldots, Dec(C, sk_N'))$$

and differs from $(sk_1, \ldots, sk_N)$ and changes the secret-key segment $sk_n$ recorded in the segment storage apparatus to $sk_n'$;
wherein
the secret-key segment changing unit changes, periodically or under a predetermined condition, the secret-key segments $sk_n$ to $sk_n'$;
the relationship $$C=\{C_1,C_2\}=\{g\hat{\ }r, Mh\hat{\ }r\}$$

$$M=Dec(C,x)=C_2/(C_1\hat{\ }x)$$

is satisfied, where {g, h} is the public key PK, x is the secret key SK and an integer greater than or equal to 0 and less than or equal to q−1, h=g^x, r is a random number and an integer greater than or equal to 0 and less than or equal to q−1, q is the order of a cyclic group G, g is the generator of the cyclic group G, M is a plaintext and an element of the cyclic group G, C is the ciphertext and an element of the cyclic group G, and ^ is a symbol representing a power; and
the functions g and f are defined as $$g(sk_1, \ldots, sk_N) = sk_1 + \ldots + sk_N \bmod q$$

$$f(Dec(C,sk_1), \ldots, Dec(C,sk_N)) = $$
$$Dec(C,sk_1) \times \ldots \times Dec(C,sk_N)/(C_2\hat{\ }(N-1)).$$

2. A segment storage apparatus of N segment storage apparatuses, for storing secret key segments for reducing the risk of leaking secret information caused by secret key leakage, which respectively record secret-key segments $sk_1, \ldots, sk_N$ obtained by segmenting a secret key SK corresponding to a public key PK, in a segmented secret-key storage system,
the relationships $$Dec(C,SK)=Dec(C,g(sk_1, \ldots, sk_N))$$

$$m_N=Dec(C,sk_N)$$

$$m_n=f(Dec(C,sk_n),m_{n+1})$$

$$M=m_1$$

being satisfied, where N is an integer not less than 2, n is an integer between 1 and N, both inclusive, Dec(C, SK) is a symbol representing decryption of the ciphertext C with the secret key SK, $g(sk_1, \ldots, sk_N)$ is a function of $sk_1, \ldots, sk_N$, and $f(Dec(C, sk_n), m_{n+1})$ is a function of $Dec(C, sk_n)$ and $m_{n+1}$;

the segment storage apparatus comprising:

a decryption unit which uses the secret-key segment $sk_N$ to obtain a plaintext segment $m_N$ given by $m_N=Dec(C, sk_N)$ and sends the plaintext segment $m_N$ to the segment storage apparatus which records the secret-key segment $sk_{N-1}$ when the secret-key segment $sk_N$ is recorded, uses a plaintext segment $m_2$ obtained from the segment storage apparatus which records the secret-key segment $sk_2$ and the secret-key segment $sk_1$ to obtain plaintext M given by $M=f(Dec(C, sk_1), m_2)$ when the secret-key segment $sk_1$ is recorded, and uses a plaintext segment $m_{n+1}$ obtained from the segment storage apparatus which records the secret-key segment $sk_{n+1}$ and the secret-key segment $sk_n$ to obtain a plaintext segment $m_n$ given by $m_n=f(Dec(C, sk_n), m_{n+1})$ and sends the plaintext segment $m_n$ to the segment storage apparatus which records the secret-key segment $sk_{n-1}$ when N is not less than 3 and the secret-key segment $sk_n$ (n is 2 to N-1) is recorded; and a secret-key segment changing unit which obtains a set of secret-key segments $(sk_1', \ldots, sk_N')$ that satisfies $Dec(C,SK)=Dec(C,g(sk_1', \ldots, sk_N'))$ $m_N=Dec(C,sk_N')$ $m_n=f(Dec(C,sk_n'),m_{n+1})$ $M=m_1$ and that differs from $(sk_1, \ldots, sk_N)$ and changes the secret-key segment $sk_n$ recorded in the segment storage apparatus to $sk_n'$;

wherein the secret-key segment changing unit changes, periodically or under a predetermined condition, the secret-key segments $sk_n$ to $sk_n'$;

the relationship $C=\{C_1,C_2\}=\{g^r,Mh^r\}$ $M=Dec(C,x)=C_2/(C_1{}^x)$ is satisfied, where $\{g, h\}$ is the public key PK, x is the secret key SK and an integer greater than or equal to 0 and less than or equal to q-1, $h=g^x$, r is a random number and an integer greater than or equal to 0 and less than or equal to q-1, q is the order of a cyclic group G, g is the generator of the cyclic group G, M is a plaintext and an element of the cyclic group G, C is the ciphertext and an element of the cyclic group G, and $\char`\^$ is a symbol representing a power; and the functions g and f are defined as $g(sk_1, \ldots, sk_N)=sk_1+ \ldots +sk_N \bmod q$ $f(Dec(C,sk_n),m_{n+1})=(Dec(C,sk_n)\times m_{n+1})/C_2$.

3. A segment storage apparatus of N segment storage apparatuses, for storing secret key segments for reducing the risk of leaking secret information caused by secret key leakage, which respectively record secret-key segments $sk_1, \ldots, sk_N$ obtained by segmenting a secret key SK corresponding to a public key PK, in a segmented secret-key storage system, the relationship $$Dec(C, SK) = Dec(C, g(sk_1, \ldots, sk_N))$$
$$= f(Dec(C, sk_1), \ldots, Dec(C, sk_N))$$

being satisfied, where N is an integer not less than 2, n is an integer between 1 and N, both inclusive, Dec(C, SK) is a symbol representing decryption of the ciphertext C with the secret key SK, $g(sk_1, \ldots, sk_N)$ is a function of $sk_1, \ldots, sk_N$, and $f(m_1, \ldots, m_N)$ is a function of $m_1, \ldots, m_N$;

the segment storage apparatus comprising:

a decryption unit which uses the secret-key segment $sk_n$ recorded in the segment storage apparatus to obtain a plaintext segment $m_n$ given by $m_n=Dec(C, sk_n)$ and sends the plaintext segment $m_n$ to a combining device; and a secret-key segment changing unit which changes the secret-key segment $sk_n$ to $sk_n'$ such that a set of secret-key segments $(sk_1', \ldots, sk_N')$ satisfies $$Dec(C, SK) = Dec(C, g(sk_1', \ldots, sk_N'))$$
$$= f(Dec(C, sk_1'), \ldots, Dec(C, sk_N'))$$

and differs from $(sk_1, \ldots, sk_N)$, wherein the secret-key segment changing unit changes, periodically or under a predetermined condition, the secret-key segments $sk_n$ to $sk_n'$;

the relationship $C=\{C_1,C_2\}=\{rG,M+rH\}$ $M=Dec(C,x)=C_2-xC_1$ is satisfied, where $\{G, H\}$ is the public key PK, x is the secret key SK and an integer greater than or equal to 1 and less than or equal to q-1, H=xG, r is a random number and an integer greater than or equal to 0 and less than or equal to q-1, q is the order of a base point G on the elliptic curve, M is a plaintext, and C is the ciphertext; and the functions g and f are defined as $g(sk_1, \ldots, sk_N)=sk_1+ \ldots +sk_N \bmod q$ $f(Dec(C,sk_1), \ldots, Dec(C,sk_N))=$
$\quad Dec(C,sk_1)+ \ldots +Dec(C,sk_N)-(N-1)C_2$.

4. A segment storage apparatus of N segment storage apparatuses, for storing secret key segments for reducing the risk of leaking secret information caused by secret key leakage, which respectively record secret-key segments $sk_1, \ldots, sk_N$ obtained by segmenting a secret key SK corresponding to a public key PK, in a segmented secret-key storage system, the relationships $Dec(C,SK)=Dec(C,g(sk_1, \ldots, sk_N))$ $m_N=Dec(C,sk_N)$ $m_n=f(Dec(C,sk_n),m_{n+1})$ $M=m_1$ being satisfied, where N is an integer not less than 2, n is an integer between 1 and N, both inclusive, Dec(C, SK) is a symbol representing decryption of the ciphertext C with the secret key SK, $g(sk_1, \ldots, sk_N)$ is a function of $sk_1, \ldots, sk_N$, and $f(\text{Dec}(C, sk_n), m_{n+1})$ is a function of $\text{Dec}(C, sk_n)$ and $m_{n+1}$;

the segment storage apparatus comprising:

a decryption unit which uses the secret-key segment $sk_N$ to obtain a plaintext segment $m_N$ given by $m_N=\text{Dec}(C, sk_N)$ and sends the plaintext segment $m_N$ to the segment storage apparatus which records the secret-key segment $sk_{N-1}$ when the secret-key segment $sk_N$ is recorded, uses a plaintext segment $m_2$ obtained from the segment storage apparatus which records the secret-key segment $sk_2$ and the secret-key segment $sk_1$ to obtain plaintext M given by $M=f(\text{Dec}(C, sk_1), m_2)$ when the secret-key segment $sk_1$ is recorded, and uses a plaintext segment $m_{n+1}$ obtained from the segment storage apparatus which records the secret-key segment $sk_{n+1}$ and the secret-key segment $sk_n$ to obtain a plaintext segment $m_n$ given by $m_n=f(\text{Dec}(C, sk_n), m_{n+1})$ and sends the plaintext segment $m_n$ to the segment storage apparatus which records the secret-key segment $sk_{n-1}$ when N is not less than 3 and the secret-key segment $sk_n$ (n is 2 to N−1) is recorded; and a secret-key segment changing unit which changes the secret-key segment $sk_n$ to $sk_n'$ such that a set of secret-key segments $(sk_1', \ldots, sk_N')$ satisfies $$Dec(C,SK)=Dec(C,g(sk_1', \ldots, sk_N'))$$

$$m_N=Dec(C,sk_N')$$

$$m_n=f(Dec(C,sk_n'),m_{n+1})$$

$$M=m_1$$

and differs from $(sk_1, \ldots, sk_N)$), wherein the secret-key segment changing unit changes, periodically or under a predetermined condition, the secret-key segments $sk_n$ to $sk_n'$;

the relationship $$C=\{C_1,C_2\}=\{rG,M+rH\}$$

$$M=Dec(C,x)=C_2-xC_1$$

is satisfied, where $\{G, H\}$ is the public key PK, x is the secret key SK and an integer greater than or equal to 1 and less than or equal to q−1, H=xG, r is a random number and an integer greater than or equal to 0 and less than or equal to q−1, q is the order of a base point G on the elliptic curve, M is a plaintext, and C is the ciphertext; and the functions g and f are defined as $$g(sk_1, \ldots, sk_N)=sk_1+ \ldots +sk_N \bmod q$$

$$f(Dec(C,sk_n),m_{n+1})=Dec(C,sk_n)+m_{n+1}-C_2.$$

5. A segmented secret-key storage method, for storing secret key segments for reducing the risk of leaking secret information caused by secret key leakage, using:

N segment storage apparatuses which respectively record secret-key segments $sk_1, \ldots, sk_N$ obtained by segmenting a secret key SK corresponding to a public key PK, and a combining device which obtains plaintext M corresponding to ciphertext C;

the relationship $$Dec(C, SK) = Dec(C, g(sk_1, \ldots, sk_N))$$
$$= f(Dec(C, sk_1), \ldots, Dec(C, sk_N))$$

being satisfied, where N is an integer not less than 2, n is an integer between 1 and N, both inclusive, Dec(C, SK) is a symbol representing decryption of the ciphertext C with the secret key SK, $g(sk_1, \ldots, sk_N)$ is a function of $sk_1, \ldots, sk_N$, and $f(m_1, \ldots, m_N)$ is a function of $m_1, \ldots, m_N$;

the segmented secret-key storage method comprising:

a decryption step in which each of the segment storage apparatuses uses the secret-key segment $sk_n$ recorded in the segment storage apparatus to obtain a plaintext segment $m_n$ given by $m_n=\text{Dec}(C, sk_n)$ and sends the plaintext segment $m_n$ to the combining device;

a combining step in which the combining device obtains the plaintext M given by $M=f(m_1, \ldots, m_N)$; and a secret-key segment changing step in which the segment storage apparatus obtains a set of secret-key segments $(sk_1', \ldots, sk_N')$ that satisfies $$Dec(C, SK) = Dec(C, g(sk_1', \ldots, sk_N'))$$
$$= f(Dec(C, sk_1'), \ldots, Dec(C, sk_N'))$$

and that differs from $(sk_1, \ldots, sk_N)$ and changes the secret-key segment $sk_n$ recorded in the segment storage apparatus to $sk_n'$, wherein the secret-key segment changing step obtains, periodically or under a predetermined condition, the set of secret-key segments $(sk_1', \ldots, sk_N')$;

the relationship $$C=\{C_1,C_2\}=\{g^r,Mh^r\}$$

$$M=Dec(C,x)=C_2/(C_1\hat{\ }x)$$

is satisfied, where $\{g, h\}$ is the public key PK, x is the secret key SK and an integer greater than or equal to 0 and less than or equal to q−1, h=g^x, r is a random number and an integer greater than or equal to 0 and less than or equal to q−1, q is the order of a cyclic group G, g is the generator of the cyclic group G, M is a plaintext and an element of the cyclic group G, C is the ciphertext and an element of the cyclic group G, and ^ is a symbol representing a power; and the functions g and f are defined as $$g(sk_1, \ldots, sk_N)=sk_1+ \ldots +sk_N \bmod q$$

$$f(Dec(C,sk_1), \ldots, Dec(C,sk_N))=$$
$$Dec(C,sk_1)\times \ldots \times Dec(C,sk_N)/(C_2\hat{\ }(N-1)).$$

6. A segmented secret-key storage method, for storing secret key segments for reducing the risk of leaking secret information caused by secret key leakage, using N segment storage apparatuses which respectively record secret-key segments $sk_1, \ldots, sk_N$ obtained by segmenting a secret key SK corresponding to a public key PK, the relationships $$Dec(C,SK)=Dec(C,g(sk_1, \ldots, sk_N))$$

$$m_N=Dec(C,sk_N)$$

$$m_n = f(Dec(C, sk_n), m_{n+1})$$

$$M = m_1$$

being satisfied, where N is an integer not less than 2, n is an integer between 1 and N, both inclusive, Dec(C, SK) is a symbol representing decryption of ciphertext C with the secret key SK, $g(sk_1, \ldots, sk_N)$ is a function of $sk_1, \ldots, sk_N$, and $f(Dec(C, sk_n), m_{n+1})$ is a function of $Dec(C, sk_n)$ and $m_{n+1}$;

the segmented secret-key storage method comprising:
an N-th decryption step in which the segment storage apparatus which records the secret-key segment $sk_N$ uses the secret-key segment $sk_N$ to obtain a plaintext segment $m_N$ given by $m_N = Dec(C, sk_N)$ and sends the plaintext segment $m_N$ to the segment storage apparatus which records the secret-key segment $sk_{N-1}$;

an n-th decryption step in which, if N is not less than 3, the segment storage apparatus which records the secret-key segment $sk_n$ (n is 2 to N−1) uses a plaintext segment $m_{n+1}$ obtained from the segment storage apparatus which records the secret-key segment $sk_{n+1}$ and the secret-key segment $sk_n$ to obtain a plaintext segment $m_n$ given by $m_n = f(Dec(C, sk_n), m_{n+1})$ and sends the plaintext segment $m_n$ to the segment storage apparatus which records the secret-key segment $sk_{n-1}$;

a first decryption step in which the segment storage apparatus which records the secret-key segment $sk_1$ uses a plaintext segment $m_2$ obtained from the segment storage apparatus which records the secret-key segment $sk_2$ and the secret-key segment $sk_1$ to obtain plaintext M given by $M = f(Dec(C, sk_1), m_2)$; and a secret-key segment changing step in which each of the segment storage apparatuses obtains a set of secret-key segments $(sk_1', \ldots, sk_N')$ that satisfies $$Dec(C, SK) = Dec(C, g(sk_1', \ldots, sk_N'))$$

$$m_N = Dec(C, sk_N')$$

$$m_n = f(Dec(C, sk_n'), m_{n+1})$$

$$M = m_1$$

and that differs from $(sk_1, \ldots, sk_N)$ and changes the secret-key segment $sk_n$ recorded in the segment storage apparatus to $sk_n'$, wherein the secret-key segment changing step obtains, periodically or under a predetermined condition, the set of secret-key segments $(sk_1', \ldots, sk_N')$;

the relationship $$C = \{C_1, C_2\} = \{g^r, Mh^r\}$$

$$M = Dec(C, x) = C_2/(C_1^x)$$

is satisfied, where {g, h} is the public key PK, x is the secret key SK and an integer greater than or equal to 0 and less than or equal to q−1, $h = g^x$, r is a random number and an integer greater than or equal to 0 and less than or equal to q−1, q is the order of a cyclic group G, g is the generator of the cyclic group G, M is a plaintext and an element of the cyclic group G, C is the ciphertext and an element of the cyclic group G, and ^ is a symbol representing a power; and the functions g and f are defined as $$g(sk_1, \ldots, sk_N) = sk_1 + \ldots + sk_N \bmod q$$

$$f(Dec(C, sk_n), m_{n+1}) = (Dec(C, sk_n) \times m_{n+1})/C_2.$$

7. A segment storage apparatus of N segment storage apparatuses, for storing secret key segments for reducing the risk of leaking secret information caused by secret key leakage, which respectively record secret-key segments $sk_1, \ldots, sk_N$ obtained by segmenting a secret key SK corresponding to a public key PK, in a segmented secret-key storage system, the relationship $$Dec(C, SK) = Dec(C, g(sk_1, \ldots, sk_N))$$
$$= f(Dec(C, sk_1), \ldots, Dec(C, sk_N))$$

being satisfied, where N is an integer not less than 2, n is an integer greater than or equal to 1 and less than or equal to N, Dec(C, SK) is a symbol representing decryption of the ciphertext C with the secret key SK, $g(sk_1, \ldots, sk_N)$ is a function of $sk_1, \ldots, sk_N$, and $f(m_1, \ldots, m_N)$ is a function of $m_1, \ldots, m_N$;

the segment storage apparatus comprising:
a decryption unit which uses the secret-key segment $sk_n$ recorded in the segment storage apparatus to obtain a plaintext segment $m_n$ given by $m_n = Dec(C, sk_n)$ and sends the plaintext segment $m_n$ to a combining device; and a secret-key segment changing unit which changes the secret-key segment $sk_n$ to $sk_n'$ such that a set of secret-key segments $(sk_1', \ldots, sk_N')$ satisfies $$Dec(C, SK) = Dec(C, g(sk_1', \ldots, sk_N'))$$
$$= f(Dec(C, sk_1'), \ldots, Dec(C, sk_N'))$$

and differs from $(sk_1, \ldots, sk_N)$, wherein the secret-key segment changing unit changes, periodically or under a predetermined condition, the secret-key segments $sk_n$ to $sk_n'$;

the relationship $$C = \{C_1, C_2\} = \{rP, M \times e(P_{ID}, rQ)\}$$

$$M = Dec(C, S_{ID}) = C_2 \times e(S_{ID}, C_1)^{-1}$$

is satisfied, where $\{P_{ID}, P, Q\}$ is the public key PK, $S_{ID}$ is the secret key SK and an integer greater than or equal to 1 and less than or equal to q−1, $S_{ID} = SP_{ID}$, Q = sP, r is a random number and an integer greater than or equal to 0 and less than or equal to q−1, $P_{ID}$ is a point on an elliptic curve of order q transformed from ID by using a hash function; P is the generator of a subgroup on the elliptic curve; s is the master secret key; e(,) represents pairing on the elliptic curve, M is a plaintext, C is the ciphertext, and ^ is a symbol representing a power; and the functions g and f are defined as $$g(sk_1, \ldots, sk_N) = sk_1 + \ldots + sk_N \bmod q$$

$$f(Dec(C, sk_1), \ldots, Dec(C, sk_N)) = Dec(C, sk_1) \times \ldots \times Dec(C, sk_N)/(C_2^{(N-1)}).$$

8. A segment storage apparatus of N segment storage apparatuses, for storing secret key segments for reducing the risk of leaking secret information caused by secret key leakage, which respectively record secret-key segments $sk_1, \ldots, sk_N$ obtained by segmenting a secret key SK corresponding to a public key PK, in a segmented secret-key storage system, the relationships $$Dec(C,SK)=Dec(C,g(sk_1,\ldots,sk_N))$$

$$m_N=Dec(C,sk_N)$$

$$m_n=f(Dec(C,sk_n),m_{n+1})$$

$$M=m_1$$

being satisfied, where N is an integer not less than 2, n is an integer greater than or equal to 1 and less than or equal to N, Dec(C, SK) is a symbol representing decryption of the ciphertext C with the secret key SK, $g(sk_1, \ldots, sk_N)$ is a function of $sk_1, \ldots, sk_N$, and $f(Dec(C, sk_n), m_{n+1})$ is a function of $Dec(C, sk_n)$ and $m_{n+1}$;

the segment storage apparatus comprising:

a decryption unit which uses the secret-key segment $sk_N$ to obtain a plaintext segment $m_N$ given by $m_N=Dec(C, sk_N)$ and sends the plaintext segment $m_N$ to the segment storage apparatus which records the secret-key segment $sk_{N-1}$ when the secret-key segment $sk_N$ is recorded, uses a plaintext segment $m_2$ obtained from the segment storage apparatus which records the secret-key segment $sk_2$ and the secret-key segment $sk_1$ to obtain plaintext M given by $M=f(Dec(C, sk_1), m_2)$ when the secret-key segment $sk_1$ is recorded, and uses a plaintext segment $m_{n+1}$ obtained from the segment storage apparatus which records the secret-key segment $sk_{n+1}$ and the secret-key segment $sk_n$ to obtain a plaintext segment $m_n$ given by $m_n=f(Dec(C, sk_n), m_{n+1})$ and sends the plaintext segment $m_n$ to the segment storage apparatus which records the secret-key segment $sk_{n-1}$ when N is not less than 3 and the secret-key segment $sk_n$ (n is 2 to N−1) is recorded; and a secret-key segment changing unit changes the secret-key segment $sk_n$ to $sk_n'$ such that a set of secret-key segments $(sk_1', \ldots, sk_N')$ satisfies $$Dec(C,SK)=Dec(C,g(sk_1',\ldots,sk_N'))$$

$$m_N=Dec(C,sk_N')$$

$$m_n=f(Dec(C,sk_n'),m_{n+1})$$

$$M=m_1$$

and differs from $(sk_1, \ldots, sk_N)$, wherein the secret-key segment changing unit changes, periodically or under a predetermined condition, the secret-key segments $sk_n$ to $sk_n'$;

the relationship $$C=\{C_1,C_2\}=\{rP, M\times e(P_{ID},rQ)\}$$

$$M=Dec(C,S_{ID})=C_2\times e(S_{ID},C_1)^{-1}$$

is satisfied, where $\{P_{ID}, P, Q\}$ is the public key PK, $S_{ID}$ is the secret key SK and an integer greater than or equal to 1 and less than or equal to q−1, $S_{ID}=SP_{ID}$, Q=sP, r is a random number and an integer greater than or equal to 0 and less than or equal to q−1, $P_{ID}$ is a point on an elliptic curve of order q transformed from ID by using a hash function; P is the generator of a subgroup on the elliptic curve; s is the master secret key; e(,) represents pairing on the elliptic curve, M is a plaintext, and C is the ciphertext; and the functions g and f are defined as $$g(sk_1,\ldots,sk_N)=sk_1+\ldots+sk_N \bmod q$$

$$f(Dec(C,sk_n),m_{n+1})=(Dec(C,sk_n)\times m_{n+1})/C_2.$$

9. A segmented secret-key storage method, for storing secret key segments for reducing the risk of leaking secret information caused by secret key leakage, using:

N segment storage apparatuses which respectively record secret-key segments $sk_1, \ldots, sk_N$ obtained by segmenting a secret key SK corresponding to a public key PK, and a combining device which obtains plaintext M corresponding to ciphertext C;

the relationship $$Dec(C, SK) = Dec(C, g(sk_1, \ldots, sk_N))$$
$$= f(Dec(C, sk_1), \ldots, Dec(C, sk_N))$$

being satisfied, where N is an integer not less than 2, n is an integer greater than or equal to 1 and less than or equal to N, Dec(C, SK) is a symbol representing decryption of the ciphertext C with the secret key SK, $g(sk_1, \ldots, sk_N)$ is a function of $sk_1, \ldots, sk_N$, and $f(m_1, \ldots, m_N)$ is a function of $m_1, \ldots, m_N$;

the segmented secret-key storage method comprising:

a decryption step in which each of the segment storage apparatuses uses the secret-key segment $sk_n$ recorded in the segment storage apparatus to obtain a plaintext segment $m_n$ given by $m_n=Dec(C, sk_n)$ and sends the plaintext segment $m_n$ to the combining device;

a combining step in which the combining device obtains the plaintext M given by $M=f(m_1, \ldots, m_N)$; and a secret-key segment changing step in which the segment storage apparatus obtains a set of secret-key segments $(sk_1', \ldots, sk_N')$ that satisfies $$Dec(C, SK) = Dec(C, g(sk_1', \ldots, sk_N'))$$
$$= f(Dec(C, sk_1'), \ldots, Dec(C, sk_N'))$$

and that differs from $(sk_1, \ldots, sk_N)$ and changes the secret-key segment $sk_n$ recorded in the segment storage apparatus to $sk_n'$, wherein the secret-key segment changing step obtains, periodically or under a predetermined condition, the set of secret-key segments $(sk_1', \ldots, sk_N')$;

the relationship $$C=\{C_1,C_2\}=\{rG, M+rH\}$$

$$M=Dec(C,x)=C_2-xC_1$$

is satisfied, where $\{G, H\}$ is the public key PK, x is the secret key SK and an integer greater than or equal to 1 and less than or equal to q−1, H=xG, r is a random number and an integer greater than or equal to 0 and less than or equal to q−1, q is the order of a base point G on the elliptic curve, M is a plaintext, and C is the ciphertext; and the functions g and f are defined as $$g(sk_1,\ldots,sk_N)=sk_1+\ldots+sk_N \bmod q$$

$$f(Dec(C,sk_1), \ldots ,Dec(C,sk_N))= \\ Dec(C,sk_1)+ \ldots +Dec(C,sk_N)-(N-1)C_2.$$

10. A segmented secret-key storage method, for storing secret key segments for reducing the risk of leaking secret information caused by secret key leakage, using N segment storage apparatuses which respectively record secret-key segments $sk_1, \ldots, sk_N$ obtained by segmenting a secret key SK corresponding to a public key PK,
the relationships $$Dec(C,SK)=Dec(C,g(sk_1, \ldots ,sk_N))$$

$$m_N=Dec(C,sk_N)$$

$$m_n=f(Dec(C,sk_n),m_{n+1})$$

$$M=m_1$$

being satisfied, where N is an integer not less than 2, n is an integer greater than or equal to 1 and less than or equal to N, Dec(C, SK) is a symbol representing decryption of ciphertext C with the secret key SK, $g(sk_1, \ldots, sk_N)$ is a function of $sk_1, \ldots, sk_N$, and $f(Dec(C, sk_n), m_{n+1})$ is a function of $Dec(C, sk_n)$ and $m_{n+1}$;
the segmented secret-key storage method comprising:
an N-th decryption step in which the segment storage apparatus which records the secret-key segment $sk_N$ uses the secret-key segment $sk_N$ to obtain a plaintext segment $m_N$ given by $m_N=Dec(C, sk_N)$ and sends the plaintext segment $m_N$ to the segment storage apparatus which records the secret-key segment $sk_{N-1}$;
an n-th decryption step in which, if N is not less than 3, the segment storage apparatus which records the secret-key segment $sk_n$ (n is 2 to N-1) uses a plaintext segment $m_{n+1}$ obtained from the segment storage apparatus which records the secret-key segment $sk_{n+1}$ and the secret-key segment $sk_n$ to obtain a plaintext segment $m_n$ given by $m_n=f(Dec(C, sk_n), m_{n+1})$ and sends the plaintext segment $m_n$ to the segment storage apparatus which records the secret-key segment $sk_{n-1}$;
a first decryption step in which the segment storage apparatus which records the secret-key segment $sk_1$ uses a plaintext segment $m_2$ obtained from the segment storage apparatus which records the secret-key segment $sk_2$ and the secret-key segment $sk_1$ to obtain plaintext M given by $M=f(Dec(C, sk_1), m_2)$; and
a secret-key segment changing step in which each of the segment storage apparatuses obtains a set of secret-key segments $(sk_1', \ldots, sk_N')$ that satisfies $$Dec(C,SK)=Dec(C,g(sk_1', \ldots ,sk_N'))$$

$$m_N=Dec(C,sk_N')$$

$$m_n=f(Dec(C,sk_n'),m_{n+1})$$

$$M=m_1$$

and that differs from $(sk_1, \ldots, sk_N)$ and changes the secret-key segment $sk_n$ recorded in the segment storage apparatus to $sk_n'$,
wherein
the secret-key segment changing step obtains, periodically or under a predetermined condition, the set of secret-key segments $(sk_1', \ldots, sk_N')$;
the relationship $$C=\{C_1,C_2\}=\{rG,M+rH\}$$

$$M=Dec(C,x)=C_2-xC_1$$

is satisfied, where $\{G, H\}$ is the public key PK, x is the secret key SK and an integer greater than or equal to 1 and less than or equal to q-1, H=xG, r is a random number and an integer greater than or equal to 0 and less than or equal to q-1, q is the order of a base point G on the elliptic curve, M is a plaintext, and C is the ciphertext; and
the functions g and f are defined as $$g(sk_1, \ldots ,sk_N)=sk_1+ \ldots +sk_N \bmod q$$

$$f(Dec(C,sk_n),m_{n+1})=Dec(C,sk_n)+m_{n+1}-C_2.$$

11. A segmented secret-key storage method, for storing secret key segments for reducing the risk of leaking secret information caused by secret key leakage, using:
N segment storage apparatuses which respectively record secret-key segments $sk_1, \ldots, sk_N$ obtained by segmenting a secret key SK corresponding to a public key PK, and
a combining device which obtains plaintext M corresponding to ciphertext C;
the relationship $$Dec(C, SK) = Dec(C, g(sk_1, \ldots , sk_N))$$
$$= f(Dec(C, sk_1), \ldots , Dec(C, sk_N))$$

being satisfied, where N is an integer not less than 2, n is an integer greater than or equal to 1 and less than or equal to N, Dec(C, SK) is a symbol representing decryption of the ciphertext C with the secret key SK, $g(sk_1, \ldots, sk_N)$ is a function of $sk_1, \ldots, sk_N$, and $f(m_1, \ldots, m_N)$ is a function of $m_1, \ldots, m_N$;
the segmented secret-key storage method comprising:
a decryption step in which each of the segment storage apparatuses uses the secret-key segment $sk_n$ recorded in the segment storage apparatus to obtain a plaintext segment $m_n$ given by $m_n=Dec(C, sk_n)$ and sends the plaintext segment $m_n$ to the combining device;
a combining step in which the combining device obtains the plaintext M given by $M=f(m_1, \ldots, m_N)$; and
a secret-key segment changing step in which the segment storage apparatus obtains a set of secret-key segments $(sk_1', \ldots, sk_N')$ that satisfies $$Dec(C, SK) = Dec(C, g(sk_1', \ldots , sk_N'))$$
$$= f(Dec(C, sk_1'), \ldots , Dec(C, sk_N'))$$

and that differs from $(sk_1, \ldots, sk_N)$ and changes the secret-key segment $sk_n$ recorded in the segment storage apparatus to $sk_n'$,
wherein
the secret-key segment changing step obtains, periodically or under a predetermined condition, the set of secret-key segments $(sk_1', \ldots, sk_N')$;
the relationship $$C=\{C_1,C_2\}=\{rP,M \times e(P_{ID},rQ)\}$$

$$M=Dec(C,S_{ID})=C_2 \times e(S_{ID},C_1)^{-1}$$

is satisfied, where $\{P_{ID}, P, Q\}$ is the public key PK, $S_{ID}$ is the secret key SK and an integer greater than or equal to 1 and less than or equal to q-1, $S_{ID}=sP_{ID}$, Q=sP, r is a random number and an integer greater than or equal to 0 and less than or equal to q−1, $F_{ID}$ is a point on an elliptic curve of order q transformed from ID by using a hash function; P is the generator of a subgroup on the elliptic curve; s is the master secret key; e(,) represents pairing on the elliptic curve, M is a plaintext, C is the ciphertext, and ^ is a symbol representing a power; and the functions g and f are defined as $$g(sk_1, \ldots, sk_N) = sk_1 + \ldots + sk_N \bmod q$$

$$f(Dec(C,sk_1), \ldots, Dec(C,sk_N)) = Dec(C,sk_1) \times \ldots \times Dec(C,sk_N)/(C_2\hat{}(N-1)).$$

12. A segmented secret-key storage method, for storing secret key segments for reducing the risk of leaking secret information caused by secret key leakage, using N segment storage apparatuses which respectively record secret-key segments $sk_1, \ldots, sk_N$ obtained by segmenting a secret key SK corresponding to a public key PK,
the relationships $$Dec(C,SK) = Dec(C, g(sk_1, \ldots, sk_N))$$

$$m_N = Dec(C, sk_N)$$

$$m_n = f(Dec(C, sk_n), m_{n+1})$$

$$M = m_1$$

being satisfied, where N is an integer not less than 2, n is an integer greater than or equal to 1 and less than or equal to N, Dec(C, SK) is a symbol representing decryption of ciphertext C with the secret key SK, $g(sk_1, \ldots, sk_N)$ is a function of $sk_1, \ldots, sk_N$, and $f(Dec(C, sk_n), m_{n+1})$ is a function of $Dec(C, sk_n)$ and $m_{n+1}$;
the segmented secret-key storage method comprising:
an N-th decryption step in which the segment storage apparatus which records the secret-key segment $sk_N$ uses the secret-key segment $sk_N$ to obtain a plaintext segment $m_N$ given by $m_N = Dec(C, sk_N)$ and sends the plaintext segment $m_N$ to the segment storage apparatus which records the secret-key segment $sk_{N-1}$;
an n-th decryption step in which, if N is not less than 3, the segment storage apparatus which records the secret-key segment $sk_n$ (n is 2 to N−1) uses a plaintext segment $m_{n+1}$ obtained from the segment storage apparatus which records the secret-key segment $sk_{n+1}$ and the secret-key segment $sk_n$ to obtain a plaintext segment $m_n$ given by $m_n = f(Dec(C, sk_n), m_{n+1})$ and sends the plaintext segment $m_n$ to the segment storage apparatus which records the secret-key segment $sk_{n-1}$;
a first decryption step in which the segment storage apparatus which records the secret-key segment $sk_1$ uses a plaintext segment $m_2$ obtained from the segment storage apparatus which records the secret-key segment $sk_2$ and the secret-key segment $sk_1$ to obtain plaintext M given by $M = f(Dec(C, sk_1), m_2)$; and
a secret-key segment changing step in which each of the segment storage apparatuses obtains a set of secret-key segments $(sk_1', \ldots, sk_N')$ that satisfies $$Dec(C,SK) = Dec(C, g(sk_1', \ldots, sk_N'))$$

$$m_N = Dec(C, sk_N')$$

$$m_n = f(Dec(C, sk_n'), m_{n+1})$$

$$M = m_1$$

and that differs from $(sk_1, \ldots, sk_N)$ and changes the secret-key segment $sk_n$ recorded in the segment storage apparatus to $sk_n'$,
wherein
the secret-key segment changing step obtains, periodically or under a predetermined condition, the set of secret-key segments $(sk_1', \ldots, sk_N')$;
the relationship $$C = \{C_1, C_2\} = \{rP, M \times e(P_{ID}, rQ)\}$$

$$M = Dec(C, S_{ID}) = C_2 \times e(S_{ID}, C_1)^{-1}$$

is satisfied, where $\{P_{ID}, P, Q\}$ is the public key PK, $S_{ID}$ is the secret key SK and an integer greater than or equal to 1 and less than or equal to q−1, $S_{ID} = sP_{ID}$, Q=sP, r is a random number and an integer greater than or equal to 0 and less than or equal to q−1, $F_{ID}$ is a point on an elliptic curve of order q transformed from ID by using a hash function; P is the generator of a subgroup on the elliptic curve; s is the master secret key; e(,) represents pairing on the elliptic curve, M is a plaintext, and C is the ciphertext; and
the functions g and f are defined as $$g(sk_1, \ldots, sk_N) = sk_1 + \ldots + sk_N \bmod q$$

$$f(Dec(C, sk_n), m_{n+1}) = (Dec(C, sk_n) \times m_{n+1})/C_2.$$

13. A segment storage apparatus of N segment storage apparatuses, for storing key secret segments for reducing the risk of leaking secret information caused by secret key leakage, which respectively record secret-key segments $sk_1, \ldots, sk_N$ obtained by segmenting a secret key SK corresponding to a public key PK, in a segmented secret-key storage system,
the relationship $$Dec(C, SK) = Dec(C, g(sk_1, \ldots, sk_N))$$
$$= f(Dec(C, sk_1), \ldots, Dec(C, sk_N))$$

being satisfied, where N is an integer not less than 2, n is an integer between 1 and N, both inclusive, Dec(C, SK) is a symbol representing decryption of the ciphertext C with the secret key SK, $g(sk_1, \ldots, sk_N)$ is a function of $sk_1, \ldots, sk_N$, and $f(m_1, \ldots, m_N)$ is a function of $m_1, \ldots, m_N$;
the segment storage apparatuses comprising:
processing circuitry configured to
use the secret-key segment $sk_n$ recorded in the segment storage apparatus to obtain a plaintext segment $m_n$ given by $m_n = Dec(C, sk_n)$ and send the plaintext segment $m_n$ to a combining device; and
obtain a set of secret-key segments $(sk_1', \ldots, sk_N')$ that satisfies $$Dec(C, SK) = Dec(C, g(sk_1', \ldots, sk_N'))$$
$$= f(Dec(C, sk_1'), \ldots, Dec(C, sk_N'))$$

and differs from $(sk_1, \ldots, sk_N)$ and changes the secret-key segment $sk_n$ recorded in the segment storage apparatus to $sk_n'$;

wherein the processing circuitry changes, periodically or under a predetermined condition, the secret-key segments $sk_n$ to $sk_n'$;

the relationship $$C=\{C_1,C_2\}=\{g\char`\^r, Mh\char`\^r\}$$

$$M=Dec(C,x)=C_2/(C_1\char`\^x)$$

is satisfied, where $\{g, h\}$ is the public key PK, x is the secret key SK and an integer greater than or equal to 0 and less than or equal to q−1, h=g^x, r is a random number and an integer greater than or equal to 0 and less than or equal to q−1, q is the order of a cyclic group G, g is the generator of the cyclic group G, M is a plaintext and an element of the cyclic group G, C is the ciphertext and an element of the cyclic group G, and ^ is a symbol representing a power; and the functions g and f are defined as $$g(sk_1, \ldots, sk_N)=sk_1+ \ldots +sk_N \bmod q$$

$$f(Dec(C,sk_1), \ldots, Dec(C,sk_N)) = Dec(C,sk_1) \times \ldots \times Dec(C,sk_N)/(C_2\char`\^(N-1)).$$

\* \* \* \* \*